US010055402B2

(12) United States Patent
Sengupta et al.

(10) Patent No.: US 10,055,402 B2
(45) Date of Patent: Aug. 21, 2018

(54) GENERATING A SEMANTIC NETWORK BASED ON SEMANTIC CONNECTIONS BETWEEN SUBJECT-VERB-OBJECT UNITS

(71) Applicant: Accenture Global Services Limited, Dublin (IE)

(72) Inventors: Shubhashis Sengupta, Bangalore (IN); Roshni Ramesh Ramnani, Bangalore (IN); Subhabrata Das, Kolkata (IN); Anitha Chandran, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 350 days.

(21) Appl. No.: 14/659,097

(22) Filed: Mar. 16, 2015

(65) Prior Publication Data

US 2015/0261743 A1 Sep. 17, 2015

(30) Foreign Application Priority Data

Mar. 17, 2014 (IN) .......................... 1390/CHE/2014

(51) Int. Cl.
*G06F 17/27* (2006.01)
*G06F 17/30* (2006.01)

(52) U.S. Cl.
CPC .......... *G06F 17/279* (2013.01); *G06F 17/273* (2013.01); *G06F 17/2705* (2013.01); *G06F 17/2775* (2013.01); *G06F 17/2785* (2013.01); *G06F 17/30731* (2013.01)

(58) Field of Classification Search
CPC combination set(s) only.
See application file for complete search history.

(56) References Cited

U.S. PATENT DOCUMENTS

| 2005/0278325 A1* | 12/2005 | Mihalcea | G06F 17/277 |
| 2010/0030552 A1* | 2/2010 | Chen | G06F 17/30734 704/9 |
| 2010/0228693 A1* | 9/2010 | Dawson | G06F 17/2705 706/12 |
| 2011/0078167 A1* | 3/2011 | Sundaresan | G06F 17/2785 707/765 |

OTHER PUBLICATIONS

Australian Patent Examination Report No. 1 corresponding to Australia Application No. 2015201364, dated Dec. 21, 2015, 10 pages.

(Continued)

*Primary Examiner* — Tammy Paige Goddard
*Assistant Examiner* — Keara Harris
(74) *Attorney, Agent, or Firm* — Harrity & Harrity, LLP

(57) ABSTRACT

A device may obtain text to be analyzed to determine semantic connections between sections of the text. The device may identify subject-verb-object (SVO) units included in the text, and may determine SVO unit information that describes the SVO units. The device may analyze the SVO unit information to determine semantic connection information that identifies one or more semantic connections between two or more of the SVO units. The one or more semantic connections may identify relationships between verbs associated with the two or more of the SVO units. The device may generate a semantic network based on the SVO unit information and the semantic connection information, and may provide information regarding the semantic network.

20 Claims, 18 Drawing Sheets

(56) References Cited

OTHER PUBLICATIONS

Apache, "OpenNLP," http://opennlp.apache.org/documentation.html, Apr. 2, 2012, 1 page.
ClearNLP, "clearnlp: Fast and robust NLP components implemented in Java," https://code.google.com/p/clearnlp/, Nov. 14, 2013, 2 pages.
Bonial et al., "English PropBank Annotation Guidelines," http://verbs.colorado.edu/~mpalmer/projects/ace/EPB-annotation-guidelines.pdf, Nov. 14, 2012, 56 pages.
University of Colorado, "Unified Verb Index," http://verbs.colorado.edu/verb-index/, Aug. 1, 2013, 1 page.
Hutchinson, "The Automatic Acquisition of Knowledge about Discourse Connectives," http://core.ac.uk/download/pdf/276795.pdf, Oct. 4, 2005, 287 pages.
Wikipedia, "Transitions (linguistics)," http://en.wikipedia.org/wiki/Transitions_(linguistics), Sep. 12, 2014, 3 pages.
Wikipedia, "Conjunctive adverb," http://en.wikipedia.org/wiki/Conjunctive_adverb, Feb. 17, 2015, 4 pages.
Levin, "Beth Levin: Department of Linguistics Stanford University," http://web.stanford.edu/~bclevin/courses, May 29, 2014, 1 page.
RavenFlow, "RavenFlow," http://www.ravenflow.com/, Oct. 20, 2011, 1 page.
Zachman, "A framework for information systems architecture," https://www.zachman.com/images/ZI_PIcs/ibmsj2603e.pdf, 1987, 17 pages.
Chklovski et al., "Verbocean: Mining the Web for Fine-Grained Semantic Verb Relations," http://www.aclweb.org/anthology/W04-3205, Jul. 30, 2004, 8 pages.
Jain et al., "Automated Review of Natural Language Requirements Documents: Generating Useful Warnings with User-extensible Glossaries Driving a Simple State Machine," http://knoesis.wright.edu/library/publications/isec2009_submission_59.pdf, Feb. 23, 2009, 9 pages.
Neill et al., "Requirements Engineering: The State of the Practice," http://www.personal.psu.edu/cjn6/Personal/Reprints/Software%20v20n6%2003.pdf, Nov. 2003, 7 pages.
Rosenberg et al., "Requirements, Testing, and Metrics," http://citeseerx.ist.psu.edu/viewdoc/download?doi=10.1.1.101.7103&rep=rep1&type=pdf, Feb. 1, 2001, 12 pages.
Kamsties et al., "Detecting Ambiguities in Requirements Documents Using Inspections," http://citeseerx.ist.psu.edu/viewdoc/download;jsessionid=6B3BE843530B389EDB225F7EA4D05441?doi=10.1.1.145.6497&rep=rep1&type=pdf, Jun. 2001, 13 pages.
Gervasi, "Reasoning About Inconsistencies in Natural Language Requirements," http://citeseerx.ist.psu.edu/viewdoc/download?doi=10.1.1.331.4923&rep=rep1&type=pdf, Jul. 26, 2005, 54 pages.
ClearNLP, "The ClearNLP Project," http://clearnlp.wikispaces.com/, Nov. 14, 2013, 2 pages.
Kamsties et al., "Taming Ambiguity in Natural Language Requirements," http://citeseerx.ist.psu.edu/viewdoc/download?doi=10.1.1.456.1925&rep=rep1&type=pdf, 2000, 8 pages.
Fabbrini et al., "An Automatic Quality Evaluation for Natural Language Requirements," http://fmt.isti.cnr.it/WEBPAPER/P11RESFQ01.pdf, 2001, 15 pages.
Mich et al., "Market research for requirements analysis using linguistic tools," http://eprints.biblio.unitn.it/387/1/NLP-CASEMarketResearch_%281%29_new_version.pdf, May 1, 2004, 25 pages.
Moser et al., "Requirements Management with Semantic Technology: An Empirical Study on Automated Requirements Categorization and Conflict Analysis," http://publik.tuwien.ac.at/files/PubDat_202218.pdf, Jul. 1, 2011, 15 pages.
Bos et al., Combining Shallow and Deep NLP Methods for Recognizing Textual Entailment, http://l2r.cs.uiuc.edu/~danr/Teaching/CS598-05/Papers/rte05_proceedings.pdf#page=69, 2005, 4 pages.
Korhonen et al., "Extended Lexical-Semantic Classification of English Verbs," http://www.cl.cam.ac.uk/~alk23/newclass.pdf, Apr. 13, 2004, 8 pages.
Miller, "WordNet: A Lexical Database for English," http://www.csee.umbc.edu/courses/691s/papers/p39-miller.pdf, Nov. 1995, 3 pages.
Schiffrin, "Discourse Markers: Language, Meaning, and Context," The Handbook of Discourse Analysis, 2001, 22 pages.
Palmer et al., "The Proposition Bank: An Annotated Corpus of Semantic Roles," http://www.cs.rochester.edu/~gildea/palmer-propbank-cl.pdf, Jan. 21, 2004, 33 pages.
OrientDB, "OrientDB," http://www.orientechnologies.com/orientdb/, Feb. 1, 2015, 2 pages.
De Marneffe et al., "Stanford typed dependencies manual," http://nlp.stanford.edu/software/dependencies_manual.pdf, Sep. 2008, 28 pages.
De Almeida Ferreira et al., "RSL-PL: A Linguistic Pattern Language for Documenting Software Requirements," http://isg.inesc-id.pt/alb/static/papers/2013/c119-df-repa-2013.pdf, Sep. 17, 2013, 8 pages.
Baker et al., "The Berkeley FrameNet Project," http://www.aclweb.org/anthology/C98-1013, 1998, 5 pages.
Li et al., "Formal and Use-Case Driven Requirement Analysis in UML," http://citeseerx.ist.psu.edu/viewdoc/download;jsessionid=8306AC4A693B2F816339D8EF07DF7B9F?doi=10.1.1.16.8053&rep=rep1&type=pdf, Mar. 2001, 25 pages.
Kroha et al., "Ontologies in Checking for Inconsistency of Requirements Specification," Proceedings of the 3rd International Conference on Advances in Semantic Processing, IEEE Computer Society, 2009, 6 pages.
Annervaz et al., "Natural Language Requirements Quality Analysis Based on Business Domain Models," 28th International Conference on Automated Software Engineering (ASE), 2013.
Sutcliffe et al., "Supporting Scenario-Based Requirements Engineering," http://research.cs.vt.edu/ns/cs5724papers/1.motivatingreuse.tpgap.sutcliffe.scenarios.pdf, Dec. 1998, 17 pages.
Gervasi, "The CICO Domain-Based Parser," www.di.unipi.it/~turini/MURST/Gervasi.ps, 2001, 52 pages.
JBoss Community, "Drools Expert," http://www.jboss.org/drool/drools-expert.html, Jan. 11, 2014, 5 pages.
Mani et al., "Machine Learning of Temporal Relations," http://www.timeml.org/site/publications/timeMLpubs/ACL06-P06-1095.pdf, Jul. 18, 2006, 8 pages.
International Telecommunications Union, "Languages and general software aspects for telecommunication systems," http://www.itu.int/rec/T-REC-z, Mar. 14, 2014, 3 pages.
Pekar, "Acquisition of Verb Entailment from Text," http://www.aclweb.org/anthology/N06-1007, Jun. 15, 2006, 8 pages.
Kit et al., "Isolating and Relating Concerns in Requirements using Latent Semantic Analysis," http://www.cse.cuhk.edu.hk/~elisa/ppl/papers/oopsla06-lo.pdf, Oct. 26, 2006, 14 pages.
Fantechi et al., "Application of Linguistic Techniques for Use Case Analysis," http://matrix.isti.cnr.it/FMT/WEBPAPER/RE02-revfin.PDF, 2003, 8 pages.
TinkerPop, "TinkerPop3," http://www.tinkerpop.com/, Dec. 22, 2014, 1 page.

* cited by examiner

GENERATING A SEMANTIC NETWORK BASED ON SEMANTIC CONNECTIONS BETWEEN SUBJECT-VERB-OBJECT UNITS

RELATED APPLICATION

This application claims priority to Indian Patent Application No. 1390/CHE/2014 filed on Mar. 17, 2014, the content of which is incorporated by reference herein in its entirety.

BACKGROUND

A text document may include multiple sentences that define instructions. Some of the instructions may depend on another instruction, may be a step in a multi-step process, or the like. In some cases, an instruction may be inconsistent with other instructions. This may be troublesome in a systems requirement document, where a missing or misplaced instruction may lead to an incorrect design of a system.

SUMMARY

According to some possible implementations, a device may include one or more processors to obtain text to be analyzed to determine semantic connections between sections of the text. The one or more processors may identify a plurality of subject-verb-object (SVO) units included in the text, and may determine SVO unit information that describes the plurality of SVO units. The one or more processors may analyze the SVO unit information to determine semantic connection information that identifies one or more semantic connections between two or more of the plurality of SVO units. The one or more semantic connections may identify relationships between verbs associated with the two or more of the plurality of SVO units. The one or more processors may generate a semantic network based on the SVO unit information and the semantic connection information, and may provide information regarding the semantic network.

According to some possible implementations, a computer-readable medium may store one or more instructions that, when executed by one or more processors, cause the one or more processors to receive text to be analyzed to identify relationships within the text. The one or more instructions may cause the one or more processors to identify a first subject-verb-object (SVO) unit and a second SVO unit included in the text. The first SVO unit may be different than the second SVO unit. The one or more instructions may cause the one or more processors to perform an SVO unit analysis to determine a semantic connection by performing at least one of: a semantic role labeling analysis that assigns role labels to words of the text, a discourse connective analysis that identifies a semantic connection based on a discourse marker, a verb relation and entailment analysis that identifies a semantic connection based on an entailment relationship, a verb classification and sentence classification analysis that assigns classifications to one or more verbs and to one or more sentences, or a boundary connector and flow analysis that determines one or more boundaries of a multi-step process. The semantic connection may describe a relationship between the first SVO unit and the second SVO unit. The one or more instructions may cause the one or more processors to provide information that describes the first SVO unit, the second SVO unit, and the semantic connection.

According to some possible implementations, a method may include obtaining, by a device, a text to analyze to generate a semantic network that describes semantic connections associated with the text. The method may include parsing, by the device, the text to facilitate analyzing the text. The method may include extracting, by the device and from the text, two or more subject-verb-object (SVO) units. The two or more SVO units may be associated with two or more verbs, and the two or more SVO units may describe one or more requirements included in the text. The method may include analyzing, by the device, the two or more SVO units to determine one or more semantic connections. The one or more semantic connections may describe one or more relationships between the two or more SVO units. The one or more relationships may be based on the two or more verbs. The method may include generating, by the device, a semantic network representation based on the two or more SVO units and the one or more semantic connections. The semantic network representation may describe the two or more SVO units and the one or more semantic connections. The semantic network representation may indicate the one or more relationships.

DETAILED DESCRIPTION

The following detailed description of example implementations refers to the accompanying drawings. The same reference numbers in different drawings may identify the same or similar elements.

A text document may include multiple sentences that define instructions (e.g., design instructions, system requirements, etc.). Some of the instructions may depend on other instructions, may be part of a conditional branch of instructions, may be part of a multi-step process, or the like. In some cases, an instruction may be inconsistent with another instruction (e.g., the instructions may be logically inconsistent, an instruction required by one or more other instructions may be absent from the text document, or the like). This may be troublesome in a systems requirement document, where a missing or misplaced requirement may lead to an incorrect design of a system and/or other costly mistakes. Implementations herein assist an author of a text document in ensuring that instructions are not missing or misplaced, such as by determining semantic connections between instructions and generating a semantic network that identifies the semantic connections. A user reviewing the document may determine that an instruction is missing or misplaced, and may correct the error, which may improve the quality of the text document.

Figure 1A:
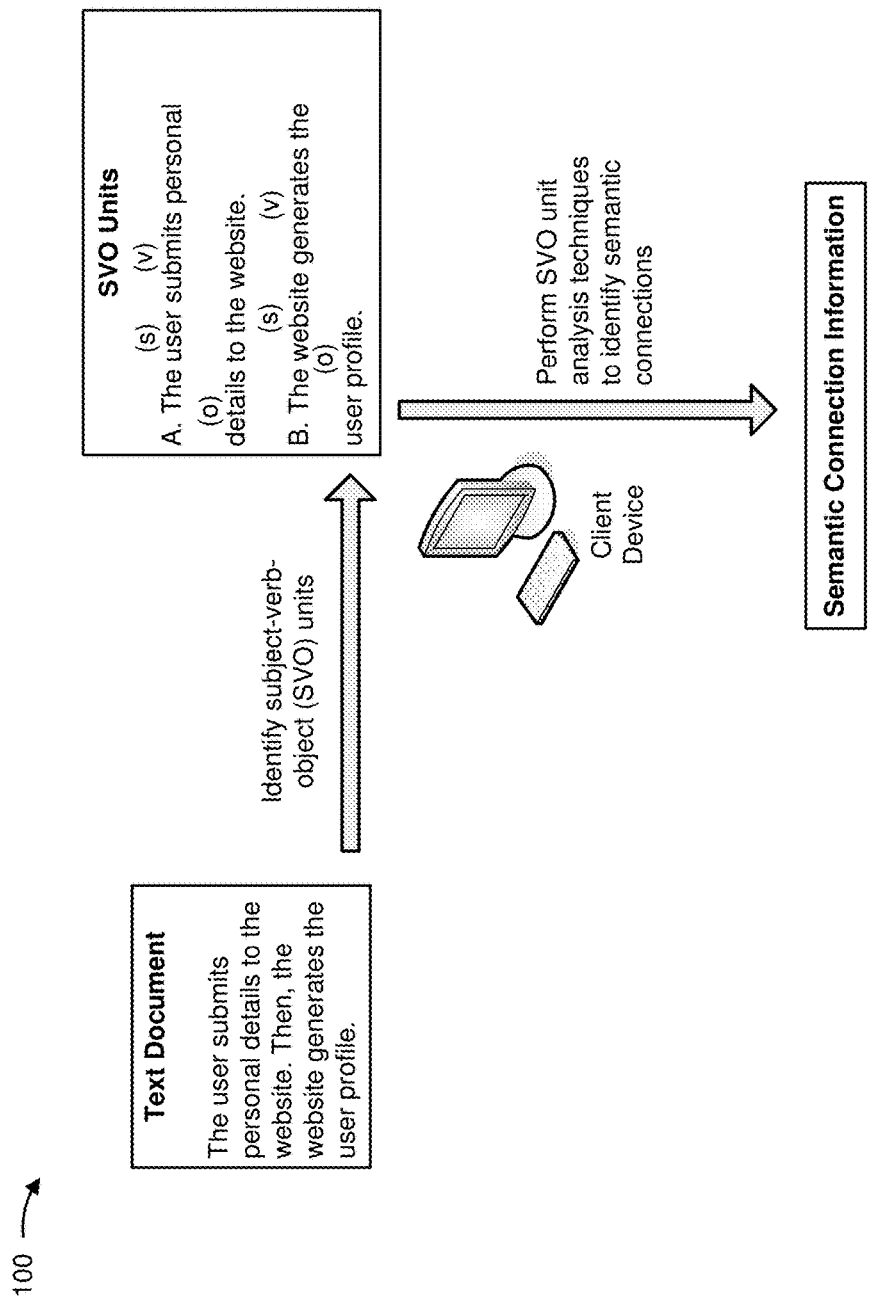
FIGS. 1A and 1B are diagrams of an overview of an example implementation described herein.
Figure 1B:
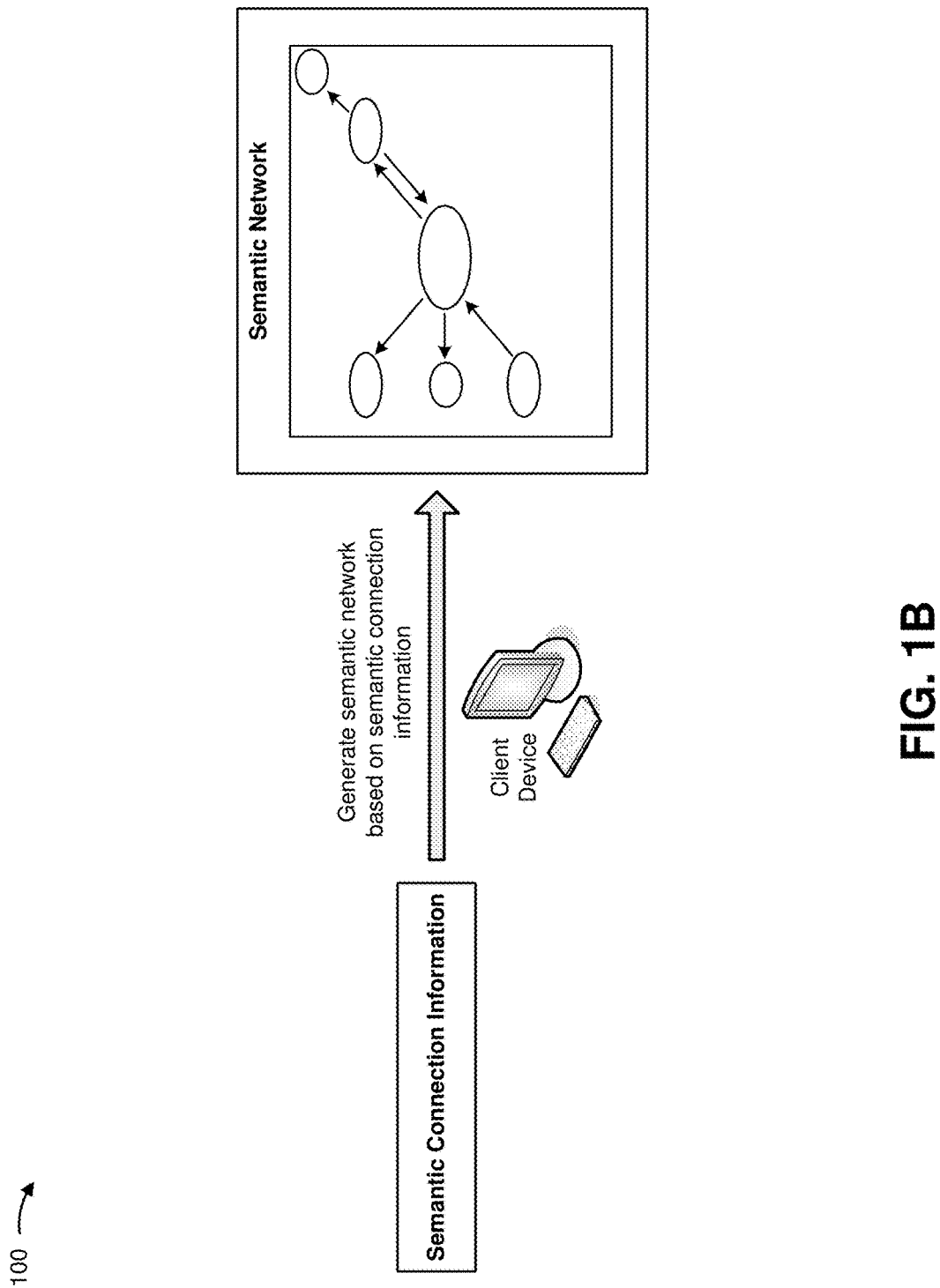

FIGS. 1A and 1B are diagrams of an overview of an example implementation 100 described herein. For the purpose of FIG. 1A, assume that a user provides (e.g., inputs, uploads, etc.) a text document to a client device. As shown in FIG. 1A, the text document may include the text string "The user submits personal details to the website. Then, the website generates the user profile." As further shown, the client device may identify subject-verb-object (SVO) units (e.g., shown as SVO unit A and SVO unit B), and may identify a subject, a verb, and an object within each SVO unit. Here, the client device identifies two SVO units that each contain one subject, one verb, and one object. As shown, the client device may perform SVO unit analysis techniques to identify semantic connections.

As shown in FIG. 1B, based on the semantic connection information, the client device may generate a semantic network representation. The semantic network representation may visually provide the semantic connection information to aid a user of the client device in understanding the semantic connection information. In this way, the client device may determine semantic connections between SVO units, and may generate a semantic network representation to describe the semantic connections, which may aid a user in understanding and detecting errors in the SVO units and/or semantic connections. For example, the semantic network representation may notify the user of an error, a missing SVO unit, or the like, which the user may correct by modifying the text document.

Figure 2:
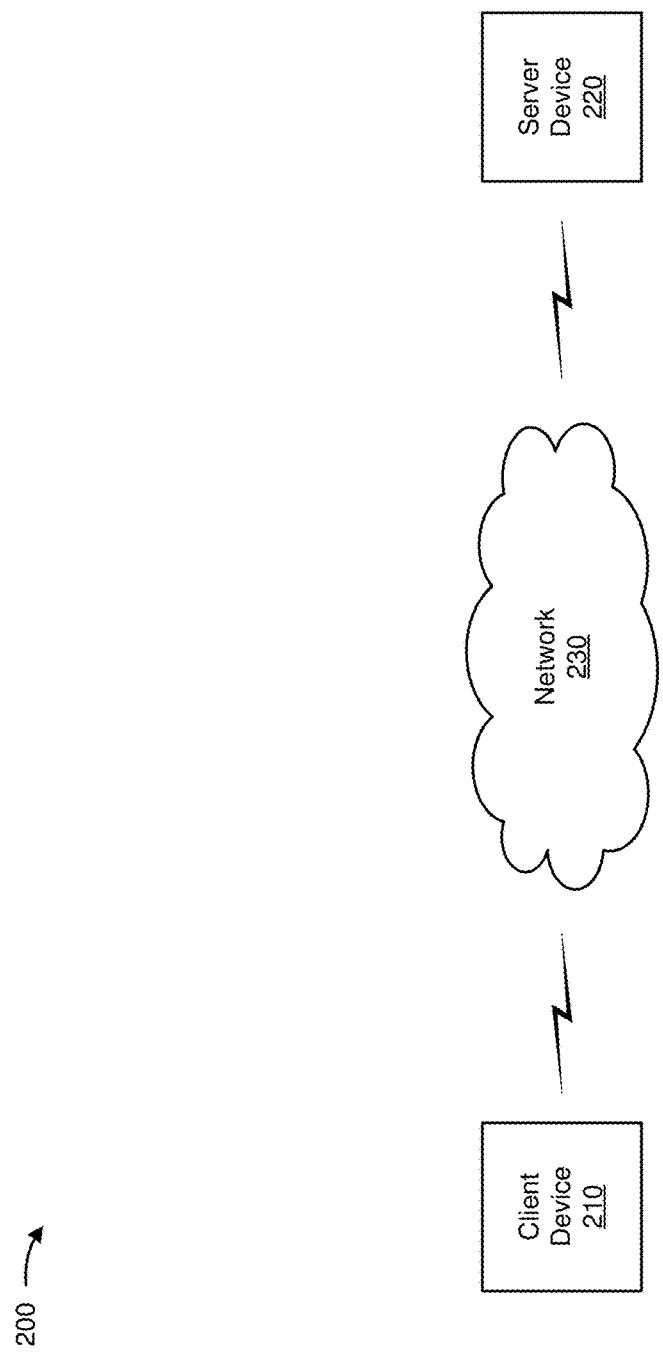
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 may include one or more devices capable of receiving, generating, storing, processing, and/or providing a text document and/or information associated with a text document (e.g., SVO units, SVO unit information, semantic connection information, a semantic network, etc.). For example, client device 210 may include a computing device, such as a desktop computer, a laptop computer, a tablet computer, a server, a mobile phone (e.g., a smart phone, a radiotelephone, etc.), or a similar device. In some implementations, client device 210 may analyze the text document to generate, store, and/or provide a semantic network representation based on the text document. In some implementations, client device 210 may receive information from and/or transmit information to server device 220 (e.g., a text document, information associated with the text document, information generated by analyzing the text document, semantic connection information, etc.). In some implementations, client device 210 may provide a user interface, and may receive and/or provide information via the user interface (e.g., text, SVO unit information, semantic connection information, a semantic network, etc.).

Server device 220 may include one or more devices capable of receiving, generating, storing, processing, and/or providing a text document and/or information associated with a text document. For example, server device 220 may include a computing device, such as a server, a desktop computer, a laptop computer, a tablet computer, or a similar device. In some implementations, server device 220 may interact with client device 210 to analyze a text document, and may store and/or provide information related to analyzing the text document (e.g., SVO unit information, semantic connection information, information describing a semantic network, a semantic network representation, or the like).

Network 230 may include one or more wired and/or wireless networks. For example, network 230 may include a cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
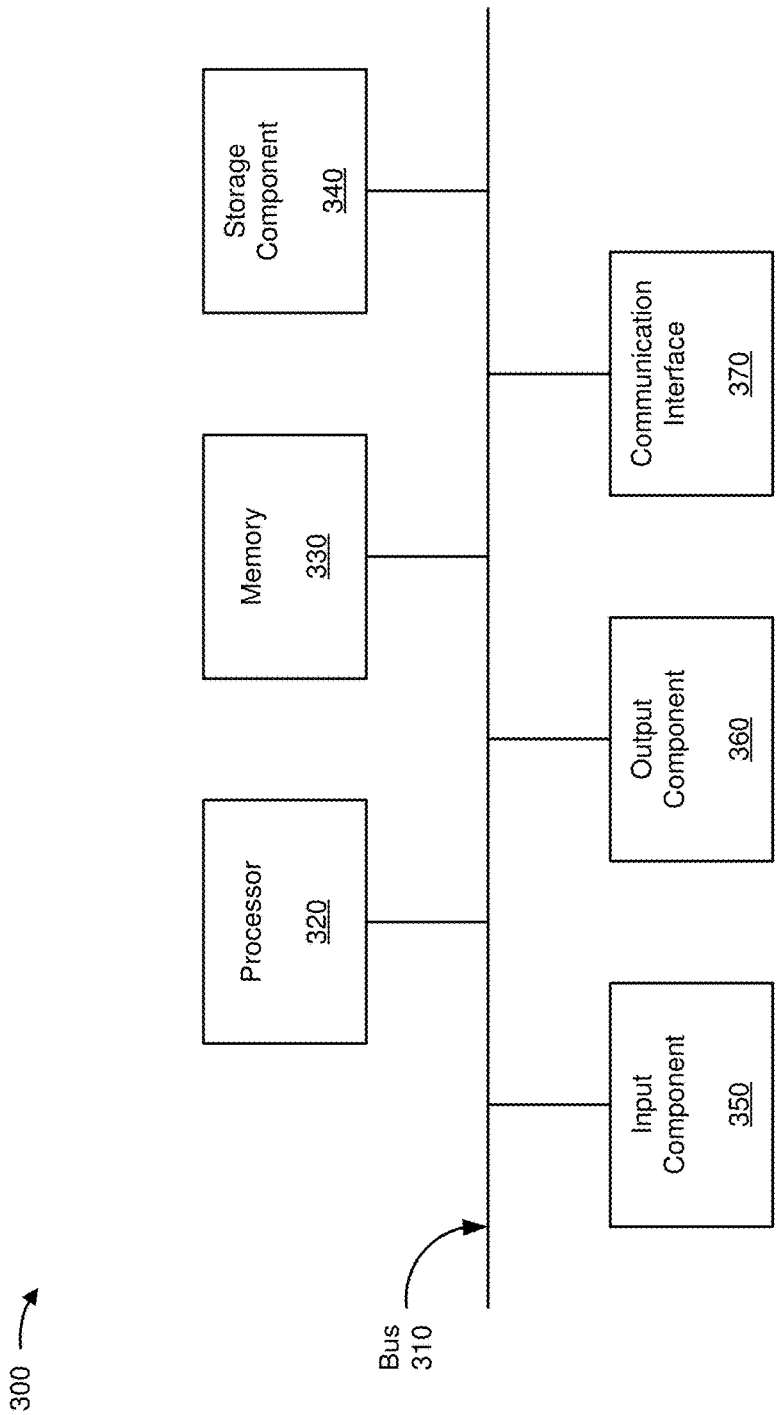
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
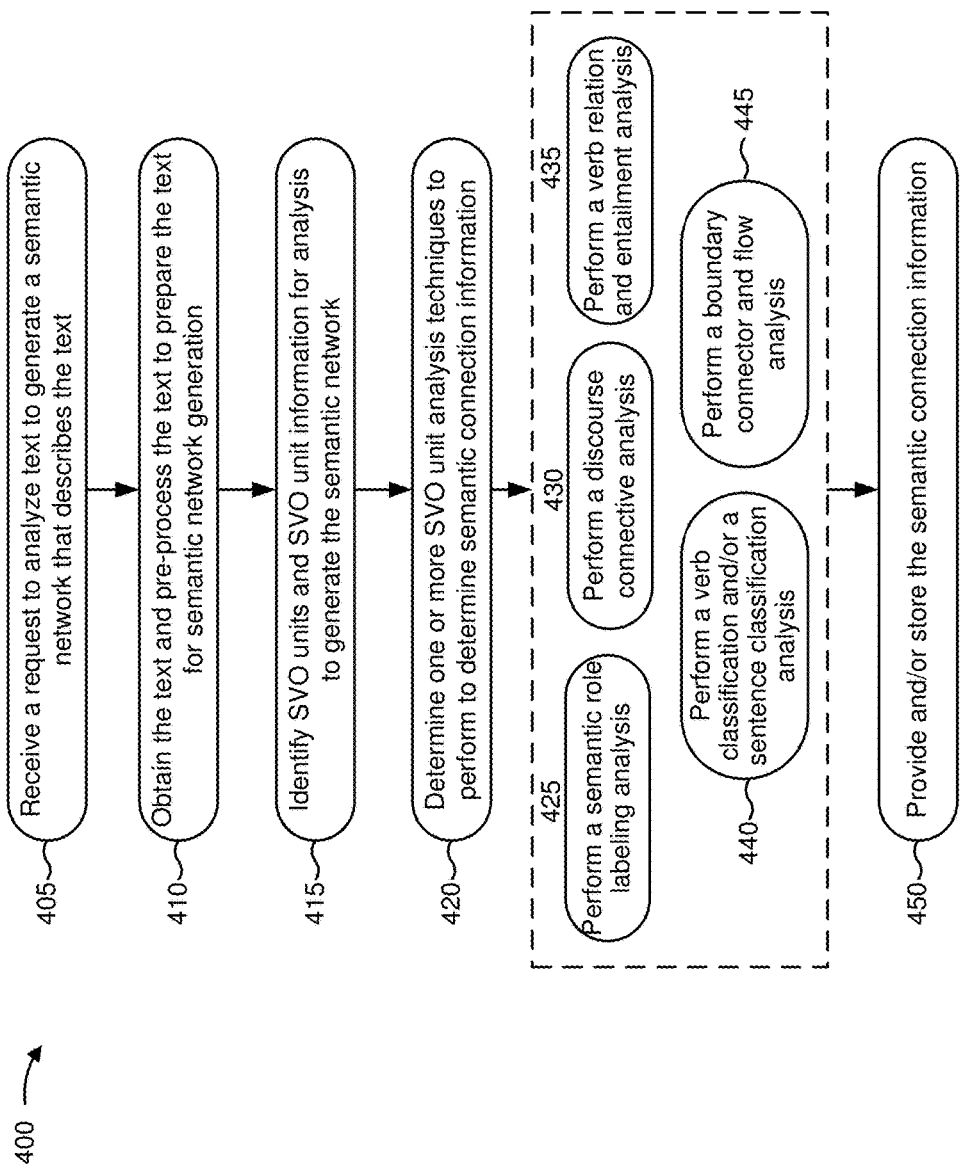
FIG. 4 is a flow chart of an example process for analyzing text to determine semantic connection information.

FIG. 4 is a flow chart of an example process 400 for analyzing text to determine semantic connection information. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving a request to analyze text to generate a semantic network that describes the text (block 405). For example, client device 210 may receive a request (e.g., from a user and/or from another device) to analyze text to generate a semantic network that describes the text. In some implementations, client device 210 may receive the request via user interaction with a user interface of client device 210. Additionally, or alternatively, client device 210 may provide a user interface with which a user may interact to provide the text (e.g., to input the text, to provide a link to the text, to upload a file including the text, etc.), and client device 210 may obtain the text based on the user interaction.

The text may include, for example, a document that includes text (e.g., a text file, a text document, a file that includes text and other information, such as images, etc.), a group of documents that include text (e.g., multiple files), a portion of a document that includes text (e.g., a portion indicated by a user, a portion identified by document metadata, etc.), and/or any information that includes text. In some implementations, the request may specify one or more sections of text to be analyzed. Additionally, or alternatively, the request may specify a manner in which the sections are to be partitioned for analysis. For example, the sections may be sentences, and the request may specify that the sentences be partitioned based on capital letters and/or periods. As another example, the sections may be paragraphs, and the request may specify that the paragraphs be partitioned based on line breaks, section breaks, indentations, or the like.

The request may identify one or more subject-verb-object (SVO) unit analysis techniques to be performed by client device 210 to identify SVO units, as described in more detail elsewhere herein. As used herein, "subject," "verb," and "object" are defined as the corresponding parts of speech. Other parts of speech may be described in this application, and are defined as the generally accepted parts of speech.

As further shown in FIG. 4, process 400 may include obtaining the text and pre-processing the text to prepare the text for semantic network generation (block 410). For example, client device 210 may receive the request to analyze the text. The request may include information identifying the text (e.g., a name of a text document) and/or may include information identifying a memory location at which the text is stored. The memory location may be local to client device 210 or external to, and possibly remote from, client device 210. Client device 210 may, based on receiving the request, retrieve the text from the memory location. The text may include multiple files storing text, a single file storing text, a portion of a file storing text, multiple lines of text, a single line of text, a portion of a line of text, etc.

Client device 210 may pre-process the text by determining sections of the text to process. For example, the request may indicate a manner in which the text is to be partitioned into sections, and client device 210 may partition the text into sections based on the indication. A text section may include, for example, a sentence, a line, a paragraph, a page, a document, a requirement (e.g., identified by a label), or the like. In some implementations, client device 210 may label one or more text sections, and may use the labels when analyzing the text to generate the semantic network. Additionally, or alternatively, client device 210 may process different text sections separately (e.g., serially or in parallel).

In some implementations, client device 210 may pre-process the text by spell-checking the text. For example, client device may apply a spell-checking algorithm to the text, and may correct one or more misspelled words. In some implementations, client device 210 may pre-process the text by performing anaphora resolution. For example, consider the sentences: "John told me the answer. Now I know it." In the second sentence, "it" is an anaphora (e.g., a pronoun that substitutes for and/or refers back to a preceding word). In this case, client device 210 may determine the preceding word for which the anaphora substitutes, and may replace the anaphora with the preceding word (e.g., "John told me the answer. Now I know the answer."). In some implementations, client device 210 may detect sentences beginning in a verb, and may insert an object at the beginning of the sentence (e.g., the sentence "Output the spreadsheet." may be pre-processed to "The system should output the spreadsheet."). In this way, client device 210 may pre-process sentences to facilitate generation of the semantic network.

In some implementations, client device 210 may pre-process the text by determining boundaries of text sections. For example, assume that a user specifies that client device 210 is to analyze a section of a document. Client device 210 may detect one or more boundaries of the section, and may indicate the one or more boundaries to prevent analysis beyond the one or more boundaries.

As further shown in FIG. 4, process 400 may include identifying SVO units and SVO unit information for analysis to generate the semantic network (block 415). For example, client device 210 may parse the text to identify SVO units. An SVO unit may be a phrase, a clause, or the like, that contains a subject, a verb, and an object. For example, consider the sentence: "Neil finds the error." Here, "Neil" is a subject, "finds" is a verb, and "error" is an object. Based on identifying the subject, the verb, and the object, client device 210 may identify the sentence as an SVO unit.

In some implementations, client device 210 may apply a parsing algorithm to a sentence (e.g., an Apache OpenNLP parsing algorithm, a ClearNLP parsig algorithm, or the like) to tag words in the sentence in order to determine SVO units and SVO unit information. The parsing algorithm may tag the words in the sentence according to a part of speech associated with the words and/or according to a role in the sentence (e.g., the parsing algorithm may tag a particular word as a noun and as a subject of a sentence). Based on the tags, client device 210 may determine an SVO unit included in the sentence (e.g., by detecting a tagged subject, a tagged verb, and/or a tagged object in the sentence).

In some implementations, the SVO unit information may include information that identifies one or more SVO units. For example, the SVO unit information may include an SVO unit identifier (e.g., a number, or the like, that identifies an SVO unit), text of the SVO unit, tags associated with one or more words of the SVO unit, a discourse connective triplet associated with the SVO unit, or the like, as described in more detail elsewhere herein.

In some implementations, client device 210 may identify a tagged coordinating conjunction that conjoins a pair of SVO units. For example, consider the sentence: "The system must display all the letters and the numbers entered." Here, client device 210 may tag "and" as a coordinating conjunction. However, client device 210 may determine that "and" does not conjoin a pair of SVO units because "and" does not separate two independent clauses. As another example, consider the sentence: "The user clicks the button and the system prints the report." Here, client device 210 may tag "and" as a coordinating conjunction, and may determine that "and" conjoins a pair of SVO units (e.g., based on a verb of "prints" following a conjunction noun of "system," based on "and" separating two independent clauses, or the like). In this way, client device 210 may determine coordinating conjunctions that conjoin pairs of SVO units.

In some implementations, client device 210 may assign an SVO unit identifier to an SVO unit. For example, assume that a first sentence includes two SVO units and that a second sentence includes one SVO unit. Assume further that client device 210 detects the three SVO units. In that case, client device 210 may assign SVO unit identifiers that identify the SVO units. For example, client device 210 may assign an SVO unit identifier of "1a" to the first SVO unit of the first sentence, an SVO unit identifier of "1b" to the second SVO unit of the first sentence, and an SVO unit identifier of "2" to the SVO unit of the second sentence. In this way, client device 210 may differentiate SVO units, which may aid client device 210 in generating the semantic network. While one possible implementation of an SVO unit identifier is described herein, other implementations are possible and may be used by client device 210.

Client device 210 may detect multiple SVO units in a single sentence. For example, consider the sentence: "The application provides the output and the device stores the output." Here, client device 210 may detect two SVO units: a first SVO unit of "the application provides the output," and a second SVO unit of "the device stores the output." In some implementations, client device 210 may detect a discourse marker of "and." The discourse marker may be a word or phrase that indicates a relationship between the first SVO unit and the second SVO unit, and client device 210 may determine semantic connection information based on the discourse marker, as described in more detail elsewhere herein.

Some SVO units may not contain one subject, one verb, and one object. For example, consider the sentence: "The ball was thrown." Here, client device 210 may detect a verb (e.g., "throw," the bare infinitive of "thrown") and an object (e.g., "ball"), and may not detect a subject. In that case, client device 210 may determine the subject using an SVO unit analysis technique. For example, client device 210 may analyze surrounding SVO units to determine the subject based on semantic role labeling, discourse connective analysis, or the like, as described in more detail elsewhere herein. As another example, consider the sentence: "John threw the ball to Mike." Here, client device 210 may detect a subject, a verb, and two objects (e.g., the two objects may be "the ball," a direct object, and "Mike," an indirect object). Client device 210 may label the direct object and the indirect object, and may determine semantic connection information based on the direct object and the indirect object.

In some implementations, client device 210 may determine a dependency between two or more words in a sentence. For example, consider the sentence: "The user submits personal details." Here, client device 210 may parse the sentence in order to tag each word with an identifier and a type (e.g., a part of speech of the word, a role of the word in the sentence, or the like). For example, "the" may be tagged with an identifier of 1 and a type of "determiner," "user" may be tagged with an identifier of 2 and a type of "noun" and/or "subject," "submits" may be tagged with an identifier of 3 and a type of "verb," and so on. In some implementations, client device 210 may determine a dependency of one or more words. For example, client device 210 may determine that "the" is dependent on "user," that "user" is dependent on "submits" (e.g., based on "user" being a subject associated with "submits"), and so on. Client device 210 may use the dependency information to determine SVO unit information that describes the SVO units.

In some implementations, client device 210 may identify a structural connection between two or more SVO units. A structural connection may be a relationship between two or more adjacent SVO units based on a structure of the two or more adjacent SVO units. For example, consider the sentence including two SVO units: "The cue ball strikes the pool ball, and the pool ball enters the hole." Here, the first SVO unit includes a noun of "pool ball" as an object. The second SVO unit includes the noun of "pool ball" as a subject. Based on both SVO units including the noun, and based on the noun being an object of the first SVO unit and a subject of the second SVO unit, client device 210 may determine a structural connection between the two SVO units, which client device 210 may use to determine semantic connection information.

In some implementations, client device 210 may identify a structural connection based on a word or a phrase that associates two adjacent SVO units. For example, client device 210 may identify a structural connection based on a coordinating conjunction, a subordinating conjunction, a correlative conjunction, or the like. As an example, consider the sentence: "The application outputs the spreadsheet, and the device stores the spreadsheet." Here, client device 210 may identify two adjacent SVO units (e.g., a first SVO unit of "The application outputs the spreadsheet" and a second SVO unit of "the device stores the spreadsheet"), and may identify a coordinating conjunction that associates the two adjacent SVO units (e.g., "and"). Client device 210 may identify a structural connection based on adjacency of the two SVO units and based on the coordinating conjunction. In this way, client device 210 may determine a structural connection between adjacent SVO units while identifying the adjacent SVO units.

In some implementations, client device 210 may identify primary and/or secondary verbs in SVO units, and/or may ignore verbs in SVO units. In some implementations, client device 210 may first tag all verbs, and may find a consecutive pair of verbs. In that case, client device 210 may ignore the first of the pair of verbs. For example, consider the sentence: "The page will be created quickly." Here, client device may detect a consecutive pair of verbs (e.g., "be" and "created") and may ignore "be," based on that verb occurring first in the consecutive pair. In some implementations, client device 210 may detect a direct object and a verb associated with the direct object. If the direct object is an abstract noun (e.g., "ability," "probability," or the like), client device 210 may ignore the verb associated with the direct object. In some implementations, client device 210 may identify a secondary verb based on the verb being a "weak" verb (e.g., "ensure," "verify," "allow," "have," "be," or the like). A weak verb may be a secondary verb that is associated with an action of a primary verb (e.g., in the phrase "verify that the device provided the spreadsheet," "verify" is a weak verb). Client device 210 may store information that identifies abstract nouns and/or weak verbs. In some implementations, if client device 210 does not ignore the verb and/or identify the verb as a secondary verb, client device 210 may identify the verb as a primary verb. In this way, client device 210 may identify primary and secondary verbs, which may be used to determine semantic connection information.

As further shown in FIG. 4, process 400 may include determining one or more SVO unit analysis techniques to perform to determine semantic connection information (block 420). For example, client device 210 may determine the SVO unit analysis technique(s) to perform, to identify semantic connection information, based on user input. Additionally, or alternatively, client device 210 may determine default SVO unit analysis technique(s) to perform. In some implementations, client device 210 may determine the SVO unit analysis technique(s) to perform based on a characteristic of the text (e.g., a size of the text, contents included in the text, a type of document that includes the text, a file format of a file that includes the text, etc.).

The SVO unit analysis technique(s) may include a semantic role labeling analysis technique, a discourse connective analysis technique, a verb relation and entailment analysis technique, a verb classification and sentence classification technique, a boundary connector and flow analysis technique, or the like. Except as otherwise noted below, client device 210 may perform a single SVO unit analysis technique, or may perform any combination of multiple SVO unit analysis techniques. When performing a combination of multiple SVO unit analysis techniques, client device 210 may perform the multiple linguistic SVO analysis techniques in any order, except as otherwise noted below.

Semantic connection information may describe a relationship between two or more SVO units. For example, a first SVO unit that requires activating a device may be semantically connected to a second SVO unit that requires deactivating the device. In some implementations, three or more SVO units may be semantically connected. For example, in a process that includes four steps that are described by four SVO units, the four SVO units may be semantically connected. As another example, consider the sentences: "If the device finds the input, then the device performs the process. Otherwise, the device throws an error." Here, three SVO units share a conditional relationship and are semantically connected based on a conditional relationship between the three SVO units. A particular semantic connection may indicate a starting SVO unit and an ending SVO unit of the particular semantic connection, a connection type associated with the particular semantic connection, a weight that describes the particular semantic connection, and/or other information related to the particular semantic connection.

As further shown in FIG. 4, process 400 may include performing a semantic role labeling analysis (block 425). For example, client device 210 may perform a semantic role labeling analysis to determine semantic connection information by assigning semantic roles to one or more nouns in a sentence. The semantic roles may indicate a relationship between the one or more nouns and a verb in the sentence. Client device 210 may perform semantic role labeling to support one or more other analysis techniques, such as a verb classification technique, a verb relation and entailment analysis, or the like.

Semantic role labeling may refer to assigning a role label to a verb and one or more arguments (e.g., a subject, a direct object, an indirect object, a preposition, etc.) of a sentence to support semantic analysis of the sentence. For example, assume that a sentence includes a verb, a subject, and an object. Client device 210 may assign the verb a role label of V, and may assign role labels of Arg0 and Arg1 to the subject and the object, respectively. In some implementations, client device 210 may store information that defines a template for semantic role labeling. For example, the template may be associated with a type of verb (e.g., a transitive non-event verb, an intransitive non-event verb, a ditransitive verb, an intransitive verb associated with an event, a transitive verb associated with an event, etc.). The template may further define one or more role labels that are associated with one or more arguments. For example, the template may indicate that a subject, an object, and a preposition are to be assigned role identifiers of Arg0, Arg1, and Arg2, respectively. A role identifier associated with a first SVO unit need not match a role identifier associated with a second SVO unit. For example, Arg2 in a first SVO unit may be an indirect object, and Arg2 in a second SVO unit may be a preposition.

In some implementations, client device 210 may use a semantic role labeling template to resolve an ambiguity in a verb classification. For example, consider the verb "direct," in a first sentence of "The user must be directed inside," and in a second sentence of "The user must direct the cursor to the button." In some contexts, "direct" may be a high-level verb (e.g., may be a verb that is not associated with a specific user action or a relationship, as in the first sentence), while in other contexts, "direct" may be a low-level action verb (e.g., may be associated with a specific user action, as in the second sentence). Assume that client device 210, while parsing the first sentence and the second sentence, tags words of the first sentence and the second sentence with parts of speech associated with the words. Client device 210 may assign role labels to the arguments associated with "direct" in the first sentence and the second sentence, and may determine whether "direct" is a high-level verb or a low-level action verb in each sentence based on the semantic role labels. For example, client device 210 may compare the parts of speech, indicated by tags associated with the arguments, to parts of speech indicated by argument templates associated with high-level verbs and low-level action verbs. Based on the parts of speech indicated by the tags matching the parts of speech indicated by the argument templates, client device 210 may determine a verb category for "direct" in the first sentence and in the second sentence. In this way, client device 210 may resolve verb classification ambiguities based on semantic role labeling, in order to determine more accurate semantic connection information.

As further shown in FIG. 4, process 400 may include performing a discourse connective analysis (block 430). For example, client device 210 may perform a discourse connective analysis to determine semantic connection information by detecting a discourse marker (e.g., "also," "too," "then," "and," "or," "but," "when," "because," "while," etc.) that connects two or more SVO units, and by determining a relationship between the SVO units based on the discourse marker and based on contextual information. In some implementations, client device 210 may store information that identifies a discourse connection (e.g., in the form of a discourse connective triplet that identifies a discourse marker, a directional keyword, and a positional keyword).

In some implementations, client device 210 may detect discourse markers. A discourse marker may be a word or phrase that connects two or more SVO units and/or two or more sentences. A discourse marker may be an adverb (e.g., "also," "too," "then," etc.), a coordinating conjunction (e.g., "and," "or," "but," etc.), a subordinate conjunction (e.g., "when," "if," etc.), a pronoun (e.g., "this," "they," "he," "she," etc.), a preposition (e.g., "because," etc.), or the like. In some implementations, client device 210 may determine a semantic class associated with the discourse marker based on predetermined semantic classes. The semantic class may be an additive class (e.g., "additionally," "for example," etc.), a contrasting class (e.g., "but," "alternatively," etc.), a causal class (e.g., "because," "consequently," etc.), a conditional class (e.g., "if," "else," etc.), a temporal-sequence class (e.g., "first," "then," etc.), a temporal-simultaneous class (e.g., "while," etc.), or the like.

In some implementations, the discourse marker may be associated with a directional keyword. The directional keyword may indicate a direction of the SVO unit that the discourse marker connects. For example, a discourse marker in a first SVO unit that is associated with a directional keyword of "forward" may connect the first SVO unit and a second SVO unit that follows the first SVO unit, while a discourse marker in the first SVO unit that is associated with a directional keyword of "backward" may connect the first SVO unit and a second SVO unit that precedes the first SVO unit. In some implementations, the directional keyword may be determined from stored information that associates discourse markers and directional keywords.

In some implementations, the discourse marker may be associated with a positional keyword. The positional keyword may indicate a position of the discourse marker in a sentence. In some implementations, the positional keyword may include "start" (e.g., the discourse marker occurs at the beginning of a sentence), "end" (e.g., the discourse marker occurs at the end of a sentence), "after_object_before_subject" (e.g., the discourse marker occurs between two SVO units in a single sentence), "contains" (e.g., the discourse marker occurs anywhere in the sentence), or the like.

In some implementations, client device 210 may determine a chain of SVO units. For example, consider the three sentences: "First, the user enters the user name. Second, the user enters the password. Third, the user must click the button." In this case, based on the discourse markers of "first," "second," and "third," client device 210 may determine that the three SVO units included in the three sentences are related (e.g., that an action associated with the first SVO unit must precede an action associated with the second SVO unit, and that the action of the second SVO unit must precede an action of the third SVO unit). In this way, client device 210 may determine a chain of SVO units, which may aid client device 210 in generating the semantic network that describes the text.

In some implementations, client device 210 may describe a discourse marker using a discourse connective triplet. For example, a discourse connective triplet may include a discourse marker, a directional keyword, and/or a positional keyword. In some implementations, the discourse connective triplet may be represented as such:

<discourse_marker, directional_keyword, positional_keyword>

For example, a discourse marker of "first" may be described by a discourse connective triple of <first, forward, start>. In some implementations, client device 210 may store discourse connective triplets that describe discourse markers.

Client device 210 may use discourse connective triplets to determine a discourse connection. For example, assume that client device 210 stores a first discourse connective triplet of <first, forward, start> and a second discourse connective triplet of <second, backward, start>. Assume further that client device 210 analyzes text that includes two adjacent SVO units: a first SVO unit of "first, the man must wash the dog," and a second SVO unit of "second, the man must dry the dog." Client device 210 may detect the boundary markers of "first" and "second" based on the first and second discourse connective triplets. That is, client device 210 may determine that "first" is at the start of the first SVO unit, that "second" is at the start of the second SVO unit, and that the two SVO units are adjacent. Based on the boundary markers of "first" and "second," based on the directions of the boundary markers (e.g., "second" being forward in the text from "first," and "first" being backward in the text from "second"), and based on the adjacency of the two SVO units, client device 210 may determine that the two SVO units are discourse connected. In some implementations, client device 210 may assign a weight (e.g., of one) to the discourse connection. In this way, client device 210 may use discourse connective triplets that describe boundary markers to determine a discourse connection. By determining the discourse connection, client device 210 may identify a semantic connection between two or more SVO units based on discourse markers, which may improve an accuracy of the semantic network.

As further shown in FIG. 4, process 400 may include performing a verb relation and entailment analysis (block 435). For example, client device 210 may perform a verb relation and entailment analysis to determine semantic connection information by detecting a verb pair and determining a relationship between the verb pair based on a verb entailment database. Based on the relationship, client device 210 may determine that a pair of sentences associated with the verb pair share a semantic connection.

Client device 210 may store, maintain, and/or access a verb entailment database. The verb entailment database may store information that identifies verb entailments. A verb entailment may be a prescriptive relationship between a first verb and a second verb. For example, assume that two verbs are in an entailment relationship. In some cases, the first verb may be a hypernym of the second verb (e.g., the first verb may be a more general term for the second verb, as "move" may be a more general term for "gallop"), may be a troponym of the second verb (e.g., the first verb may be a more precise term for the second verb, as "stroll" is a troponym of "walk"), may be an antonym of the second verb (e.g., may be an opposite, as "increase" is an antonym of "decrease"), or the like. In some cases, the entailment relationship may indicate that an action associated with the first verb happens before an action associated with the second verb (e.g., as "create" happens before "edit," or "submit" happens before "resubmit), that the first verb causes the second verb (e.g., as a particular process "failing" may cause the particular process to "stop"), that the first verb implies the second verb (e.g., as "authenticate" may imply "validate"), or the like. The entailment database may store information that identifies verbs and entailment relationships between the verbs.

In some implementations, the entailment database may store information that indicates a direction associated with an entailment relationship. For example, the direction may be uni-directional or may be bi-directional. In a uni-directional entailment relationship, a usage of a first verb may entail a usage of a second verb, but a usage of the second verb may not entail a usage of the first verb. For example, a usage of "disconnect" entails an earlier usage of "connect," and a usage of "connect" may or may not entail a later usage of "disconnect." In that case, "disconnect" may share a uni-directional entailment relationship with "connect." The entailment database may indicate the uni-directional entailment relationship. As another example, "grant" may share a bi-directional entailment relationship with "deny," based on "grant" being an opposite of "deny." The entailment database may store information that indicates the bi-directional entailment relationship. In this way, the entailment database may indicate a direction of an entailment relationship, which may improve accuracy of the verb relation and entailment analysis.

In some implementations, client device 210 may perform a verb relation and entailment analysis using the verb entailment database. For example, assume that a user provides a textual proximity limit (e.g., the textual proximity limit may be denoted by a variable value of k) that identifies a maximum threshold separation of a pair of SVO units, for purposes of determining a verb entailment relationship. Assume further that client device 210 detects a pair of SVO units. Assume that a first SVO unit of the pair of SVO units contains the verb "open" and that a second SVO unit of the pair of SVO units contains the verb "close." Client device 210 may determine a quantity of SVO units between the first SVO unit and the second SVO unit (e.g., the quantity of units may be denoted by a variable value of n). Based on n being less than k, client device 201 may determine an entailment relationship between the first SVO unit and the second SVO unit. Client device 210 may further determine a weight (e.g., denoted by a variable value of w) associated with the entailment relationship by performing the operation (k−n)/k. The weight may be used to determine semantic connection information, as described in more detail elsewhere herein. In this way, client device 210 may determine semantic connection information between SVO units that include verbs that share an entailment relationship using a verb relation and entailment analysis. This may aid client device 210 in identifying missing instructions, inconsistent instructions, or the like.

As further shown in FIG. 4, process 400 may include performing a verb classification analysis and/or a sentence classification analysis (block 440). For example, client device 210 may perform a verb classification analysis on the text to categorize specific usages of verbs based on context, which may aid in generating the semantic network. In some implementations, client device 210 may perform a sentence classification analysis on the text to classify a sentence based on one or more discourse connections within the sentence and/or based on a classification assigned to a verb within the sentence. Based on the verb classification analysis and sentence classification analysis, client device 210 may determine semantic connection information for generating a semantic network.

In some implementations, client device 210 may perform the verb classification analysis based on a verb ontology database. For example, a verb ontology database may store information that identifies verbs and information that associates the verbs with verb categories, verb classifications, and/or verb buckets. A verb category may be a basic category to which the verb belongs. For example, the verb ontology database may identify a particular verb as a high-level verb (e.g., a verb that is not associated with a specific user action or a relationship, such as "accommodate" in the sentence "the hotel should accommodate the visitor"), a relational verb (e.g., a verb that describes a relationship between a subject and an object, such as "includes" in the sentence "the meal includes a hamburger"), or a low-level action verb (e.g., a verb that describes a specific user action, such as "throws" in the sentence "John throws the ball").

The verb ontology database may associate verbs with a classification (e.g., a classification of a verb may be more specific than a category, and may define a class of action associated with the verb, such as action-output, action-start, or action-pause). The verb ontology database may associate one or more verbs with a verb bucket. A verb bucket may be a specific description of a verb based on an action or relationship associated with the verb. For example, the verbs "archive," "download," and "paste" may be associated with a verb bucket of "store." As another example, the verbs "approve," "authorize," "admit," and "permit" may be associated with a verb bucket of "grant."

Client device 210 may classify a verb based on the verb ontology database. For example, client device 210 may determine whether a verb is included in the verb ontology database. Based on the verb being included in the verb ontology database, client device 210 may determine a verb category, a verb classification, and/or a verb bucket associated with the verb (e.g., by referencing the verb ontology database). For example, assume that client device 210 determines that the verb "create" is included in the verb ontology database. Based on the verb ontology database, client device 210 may determine that the verb "create" is a low-level action verb, and that the verb "create" is associated with a verb classification of "action-create" and a verb bucket of "create." In this way, client device 210 may classify a verb based on the verb ontology database, which may improve the semantic network.

In some implementations, the verb ontology database may not store information that identifies a verb bucket associated with a particular verb. In that case, client device 210 may assign the particular verb as the verb bucket. For example, assume that the verb ontology database does not store information that associates a verb "focus" with a verb bucket. In that case, client device 210 may assign a verb bucket of "focus" to the verb.

In some implementations, a verb may be associated with multiple verb classifications and/or verb buckets. Client device 210 may determine an appropriate verb classification and/or verb bucket for the verb based on role labels and/or based on a particular rule defined by the verb ontology database. For example, consider the verb "disconnect." Assume that the verb is associated with two verb classifications in the verb ontology database: "action-execute" and "action-end." Assume further that the verb ontology database defines the following rule to classify the verb: "If Arg0 is a user, then the verb classification is 'action-end.'" Based on the rule, and based on a noun associated with Arg0, client device 210 may classify the usage of "disconnect." For example, in the sentence "the user disconnects the cable," in which "user" is associated with a role label of Arg0, client device 210 may classify "disconnect" as an "action-end" verb. As another example, if Arg0 is not a user, client device 210 may classify "disconnect" as an "action-execute" verb. In this way, client device 210 may classify a verb based on a rule and based on role labels.

In some implementations, client device 210 may determine that a verb is not included in the verb ontology database. For example, client device 210 may attempt to classify a verb, and may determine that the verb is not included in the verb ontology database. In some implementations, client device 210 may attempt to classify an unidentified verb by determining an analogous verb that is in the verb ontology database. For example, client device 210 may reference a verb entailment database to determine an analogous verb (e.g., based on the analogous verb being a hypernym, a hyponym, a troponym, a synonym, etc. of the unidentified verb) that is included in the verb ontology database. Client device 210 may classify the analogous verb based on the verb ontology database, and may classify the unidentified verb based on classifying the analogous verb (e.g., may assign the same verb category, verb classification, and/or verb bucket to the unidentified verb and the analogous verb). In this way, client device 210 may classify a verb that is not included in the verb ontology database by finding an analogous verb that is included in the verb ontology database, which may increase a quantity of verbs that client device 210 is capable of classifying.

In some implementations, client device 210 may perform a sentence classification analysis. For example, client device 210 may classify a sentence based on one or more discourse markers associated with the sentence and based on one or more verb buckets associated with one or more verbs of the sentence. Client device 210 may classify the sentence to aid a user in understanding semantic connection information associated with the sentence. For example, assume that a particular sentence includes a verb that is associated with a verb bucket of "start" and assume that the particular sentence includes a discourse marker of "because." In that case, client device 210 may determine sentence classification information that classifies the sentence as "causal" (e.g., based on the discourse marker of "because" being associated with a semantic class of "causal") and as "action-start" (e.g., based on the verb bucket of "start" being associated with a verb classification of "action-start"). Client device 210 may provide the sentence classification information to a user to aid the user in interpreting a semantic network that includes the sentence.

As further shown in FIG. 4, process 400 may include performing a boundary connector and flow analysis (block 445). For example, client device 210 may perform a boundary connector and flow analysis on the text to determine one or more boundaries (e.g., a start, an end, or the like) of a multi-step process based on structural connections between multiple SVO units. Client device 210 may perform a flow analysis to determine information that describes the multi-step process.

In some implementations, client device 210 may identify one or more boundaries of a multi-step process based on a verb classification and/or one or more role labels. For example, assume that a multi-step process is defined by the sentences: "The woman fills the bucket. The woman moves the bucket. The woman empties the bucket." Client device 210 may identify a semantic connection between the first sentence and the third sentence based on an entailment relationship shared by the verbs in the first and third sentence (e.g., based on a usage of "empty" implying an earlier usage of "fill"). Client device 210 may perform a semantic role labeling analysis, and may determine that the arguments associated with the first, second, and third sentences are equivalent (e.g., in each sentence, client device 210 may assign a label of Arg0 to "woman" and a label of Arg1 to "bucket," and may determine that the arguments are equivalent based on the labels). Based on the semantic connection, and based on the arguments of the first, second, and third sentences being equivalent, client device 210 may determine that the first sentence is a first boundary of the multi-step process, and that the third sentence is a second boundary of the multi-step process.

In some implementations, client device 210 may identify boundaries of a multi-step process based on verb classifications. For example, client device 210 may identify a sentence as a starting sentence of a multi-step process based on a verb classification that indicates a starting action, an input action, or the like. Client device 210 may identify a sentence as an intermediate step of the multi-step process based on a verb classification that identifies an execution action, a definition action, or the like. Client device 210 may identify a sentence as an ending sentence of the multi-step process based on a verb classification that identifies an output action, an ending action, or the like. Client device 210 may store and/or provide information that identifies the one or more boundaries (e.g., may provide the information for display in association with a semantic network, or the like). In this way, client device 210 may identify one or more boundaries of a multi-step process based on verb classifications of verbs included in the multi-step process.

In some implementations, client device 210 may perform a flow analysis to determine information that describes a multi-step process. For example, client device 210 may identify a starting sentence of a multi-step process and may identify one or more child sentences that are semantically connected with the starting sentence. Client device 210 may determine a flow type (e.g., a decision flow type, a process flow type, or the like) that describes the multi-step process based on one or more semantic connections between the starting sentence and the one or more child sentences. For example, client device 210 may detect a conditional semantic connection (e.g., based on discourse markers of "if," "then," "else," or the like), and may determine that the multi-step process is associated with a decision flow type. Client device 210 may store and/or provide information that identifies the flow type and/or information that describes the multi-step process (e.g., may provide the information for display in association with a semantic network). In this way, client device 210 may determine semantic connection information that describes a multi-step process in a text by analyzing semantic connections between steps of the multi-step process. Client device 210 may use the semantic connection information to generate a semantic network that includes the multi-step process, and may include, with the semantic network, the information determined by performing the flow analysis.

As further shown in FIG. 4, process 400 may include providing and/or storing the semantic connection information (block 450). For example, client device 210 may provide and/or store the semantic connection information. In some implementations, client device 210 may provide the semantic connection information to another device, such as server device 220, to generate a semantic network. In some implementations, client device 210 may store the semantic connection information locally and may generate the semantic network based on the semantic connection information.

In some implementations, client device 210 may detect an inconsistency of the text based on the semantic connection information. For example, client device 210 may find an inconsistency in a consequence of a particular SVO unit (e.g., the particular SVO unit may be followed by a first consequent SVO unit in some cases, and a second consequent SVO unit in other cases), in a logical relationship between two SVO units (e.g., in a first circumstance, two SVO units are semantically connected to a third SVO unit, and in a second circumstance, only one of the two SVO units is semantically connected to the third SVO unit), in an operation prescribed by an SVO unit (e.g., a first SVO unit may include a "delete" verb, and may not share a semantic connection with a second SVO unit that includes a "create" verb, or the like), in a conditional relationship (e.g., a first SVO unit may include an "if" coordinating conjunction, and a second SVO unit may not contain a "then" coordinating conjunction), or the like.

In some implementations, client device 210 may provide information that identifies an inconsistency in a text. For example, client device 210 may provide a warning to a user of client device 210 that identifies the inconsistency. Additionally, or alternatively, client device 210 may generate a semantic network, and may indicate the inconsistency in the semantic network (e.g., by providing a message in the semantic network that indicates the inconsistency, or the like). In this way, client device 210 may aid a user in interpreting a text by identifying inconsistencies in the text based on semantic connection information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5G are diagrams of an example implementation 500 relating to example process 400 shown in FIG. 4. FIGS. 5A-5G show an example of analyzing text to determine semantic connection information.

Figure 5A:
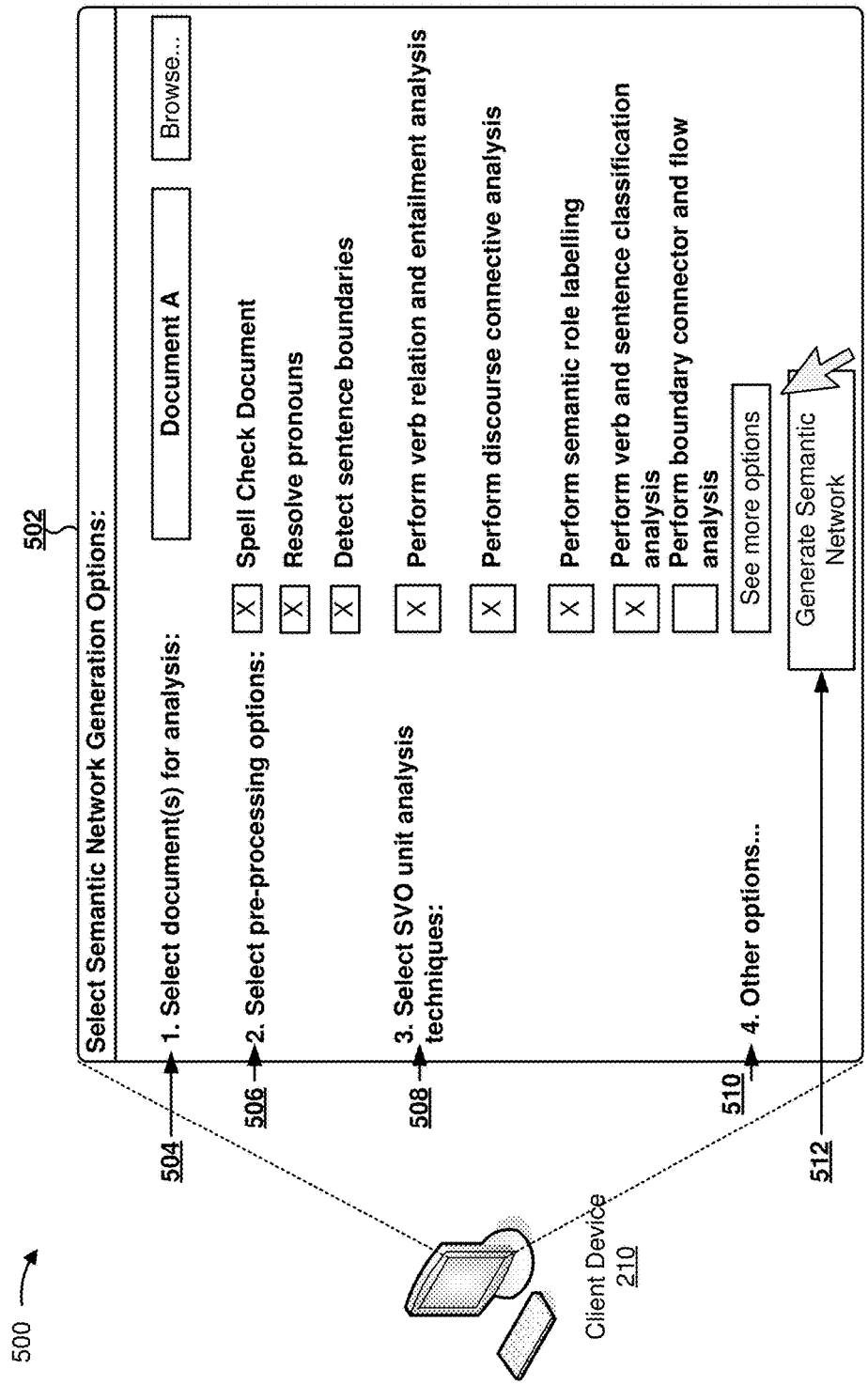
FIGS. 5A-5G are diagrams of an example implementation relating to the example process shown in FIG. 4.

As shown in FIG. 5A, client device 210 may provide a user interface 502 for a user to input options associated with analyzing the text to determine semantic connection information. As shown by reference number 504, the user may select one or more documents on which to perform the analysis. For example, the user may type a name of the document(s) and/or may browse a list of files and select the document(s) from the list of files (e.g., by interacting with a "Browse . . . " button). Assume that the user has identified a document, shown as "Document A." As shown by reference number 506, the user may select pre-processing options, such as whether to spell check the document, whether to resolve pronouns in the document, and whether to detect section boundaries in the document.

As shown by reference number 508, the user may select one or more SVO unit analysis techniques to be performed on the text by client device 210. Assume that the user has selected to perform a semantic role labeling analysis, a verb relation and entailment analysis, a discourse connective analysis, and a verb and sentence classification analysis, and not to perform a boundary connector and flow analysis, as shown. As shown by reference number 510, the user may select other options, such as a textual proximity limit to be used when performing an analysis (e.g., relating to one or more thresholds described elsewhere herein), or the like. As shown by reference number 512, assume that the user interacts with an input mechanism to cause client device 210 to perform the analysis.

Figure 5B:
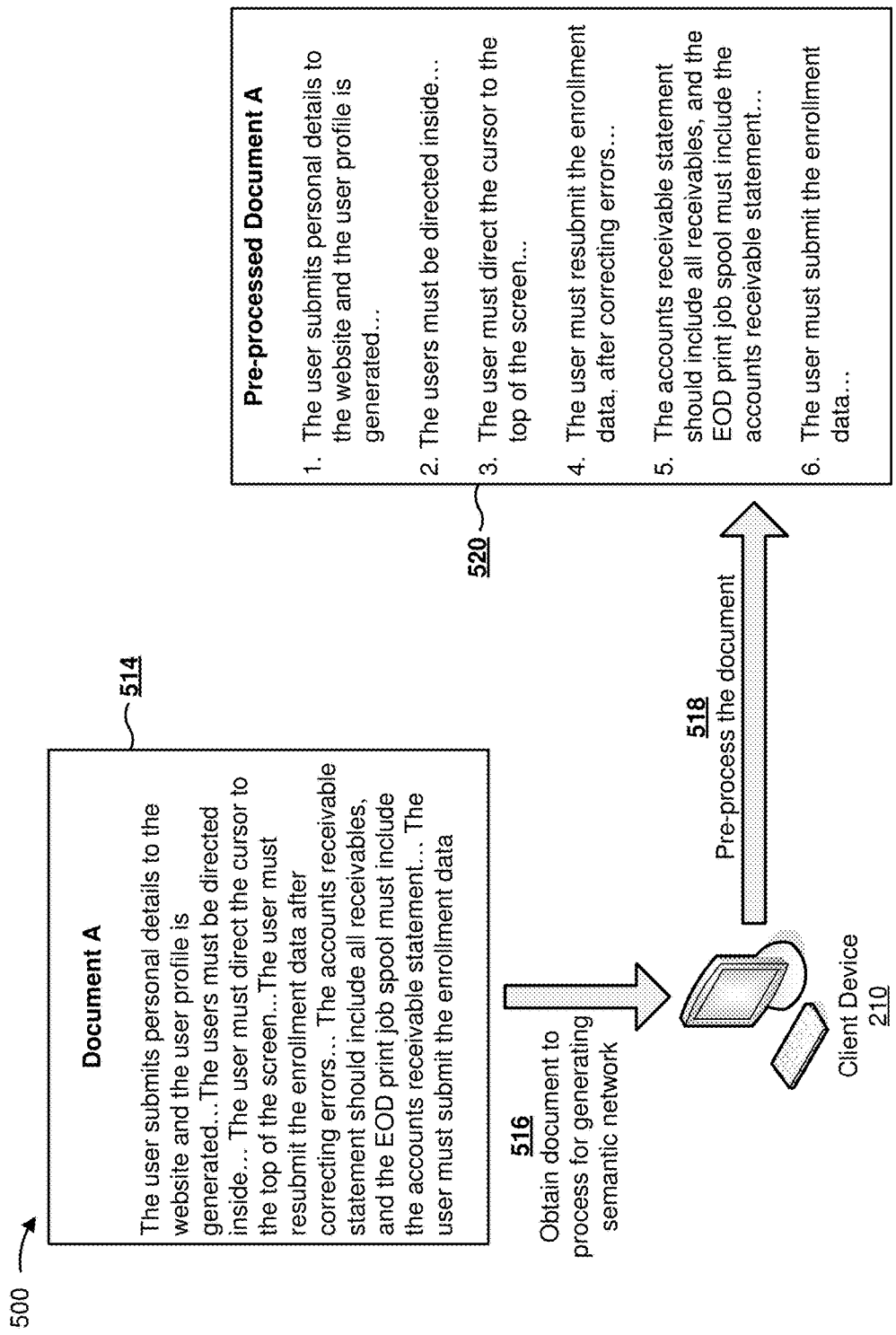

As shown in FIG. 5B, and by reference number 514, assume that Document A includes text relating to various requirements for a system to be designed. Further, assume that Document A is written using natural language text, and includes various phrases, such as "The users must be directed inside," "The user must resubmit the enrollment data, after correcting errors," etc., as shown. As shown by reference number 516, client device 210 obtains Document A based on the user interaction with the input mechanism. As shown by reference number 518, client device 210 pre-processes Document A into individual sentences or phrases to be parsed to identify SVO units. Assume that client device 210 performs additional processing, such as spell checking the document, resolving pronouns, inserting spaces around punctuation, etc. As shown by reference number 520, assume that the preprocessed document includes six phrases and a number associated with each of the six phrases.

Figure 5C:
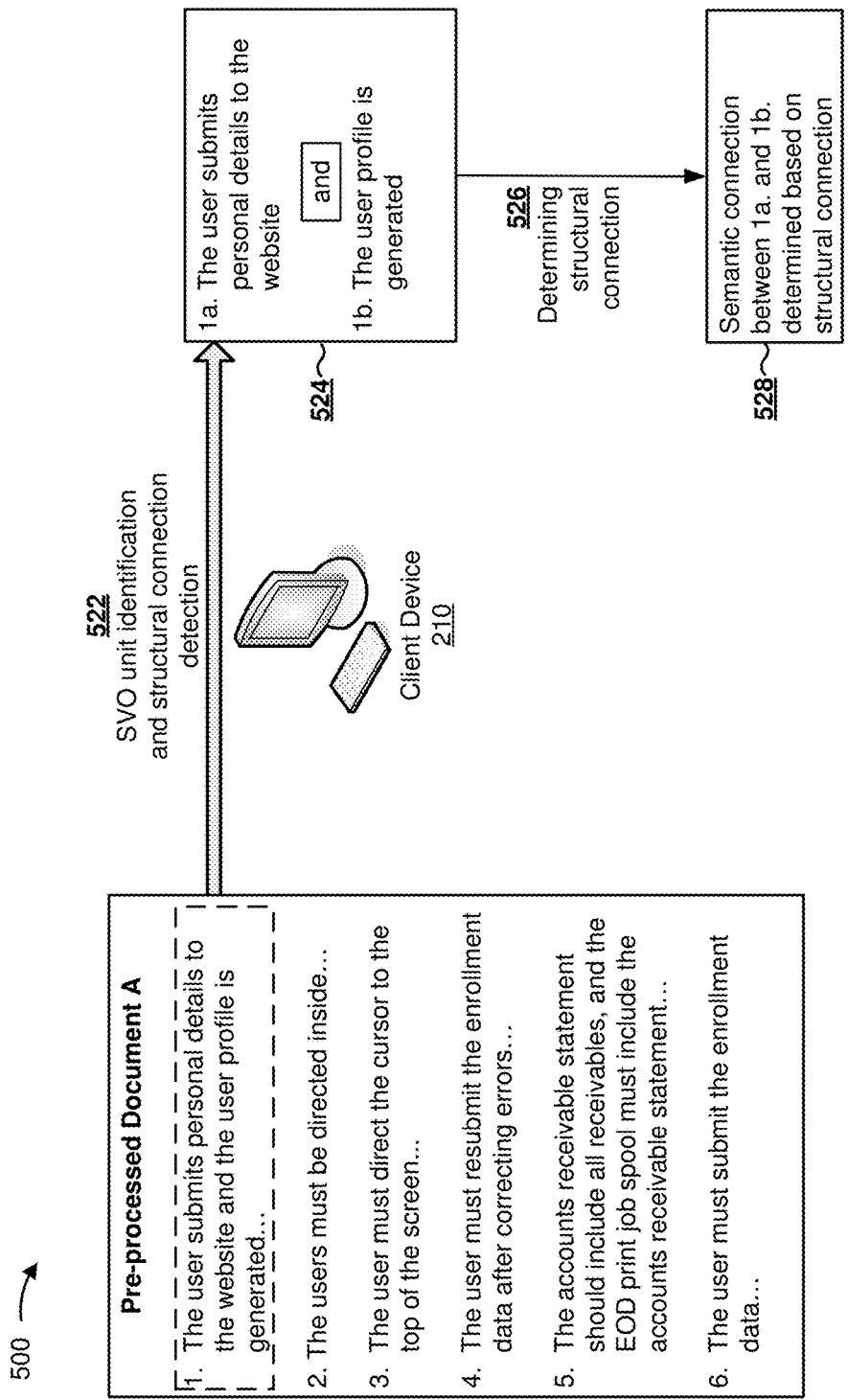

As shown in FIG. 5C, and by reference number 522, client device 210 may parse the preprocessed document to identify SVO units and to detect structural connections. As shown by reference number 524, assume that client device 210 detects two SVO units in the first sentence of the preprocessed document (e.g., "The user submits personal details to the website," designated SVO unit 1a, and "The user profile is generated," designated SVO unit 1b). As further shown, assume that client device 210 detects a correlating conjunction between the clauses (e.g., "and"). As shown by reference number 526, client device 210 may determine a structural connection shared by SVO unit 1a and 1b. As shown by reference number 528, assume that client device 210 determines a semantic connection shared by SVO unit 1a and SVO unit 1b based on the structural connection shared by SVO unit 1a and 1b.

Figure 5D:
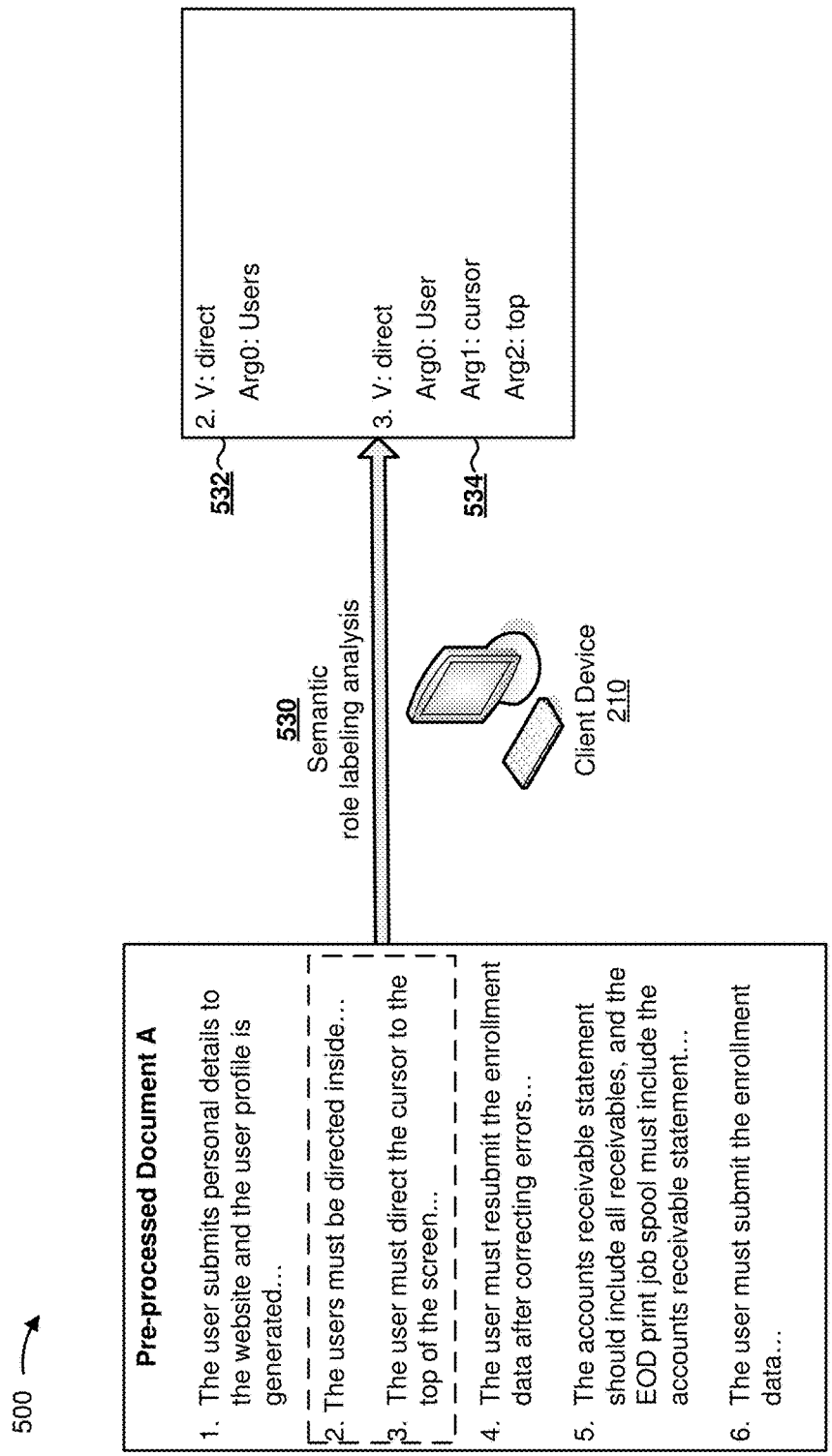

As shown in FIG. 5D, client device 210 may perform a semantic role labeling analysis on the pre-processed document to assign semantic roles to the nouns and verbs of the pre-processed document. As shown by reference number 530, assume that client device 210 performs a semantic role labeling analysis on sentences 2 and 3. As shown by reference number 532, client device 210 assigns semantic roles to words of sentence 2. Here, client device 210 assigns a role of Arg0 to the subject, "users." Assume that client device 210 assigns the role of Arg0 to the subject based on a first role labeling template associated with a structure of sentence 2 (e.g., an appropriate template for sentence 2 may be determined based on tagged words of sentence 2, or the like). As shown by reference number 534, client device 210 assigns semantic roles to words of sentence 3. Here, client device 210 assigns a role of Arg0 to the subject, "user," a role of Arg1 to the direct object, "cursor," and a role of Arg2 to the prepositional object, "top." Assume that client device 210 assigns the roles of Arg0, Arg1, and Arg2 based on a second role labeling template associated with a structure of sentence 3 (e.g., an appropriate template for sentence 3 may be determined based on tagged words of sentence 3, or the like).

Figure 5E:
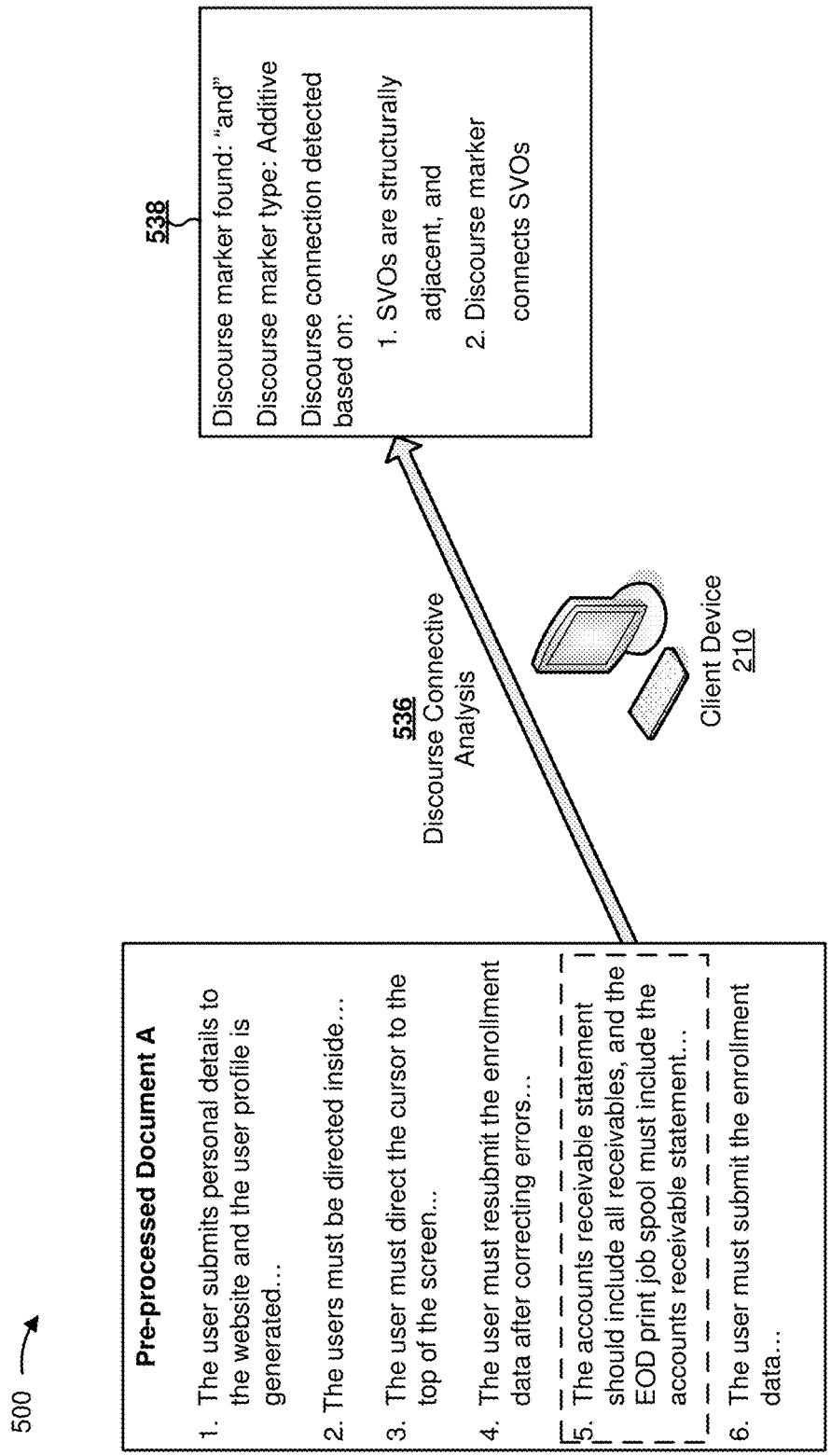

As shown in FIG. 5E, client device 210 may perform a discourse connective analysis to determine semantic connection information shared by structurally adjacent SVO units. As shown by reference number 536, client device 210 may perform a discourse connective analysis on sentence 5. As shown by reference number 538, client device 210 may detect a discourse marker that connects the first SVO unit and the second SVO unit of sentence 5 (e.g., "and"). As further shown, client device 210 may determine a discourse marker type associated with the discourse marker (e.g., additive). Assume that client device 210 determines the discourse marker type based on stored discourse marker information. As further shown, assume that client device 210 determines the discourse connection based on the first SVO unit and the second SVO unit being structurally adjacent, and based on the discourse marker connecting the first SVO unit and the second SVO unit.

Figure 5F:
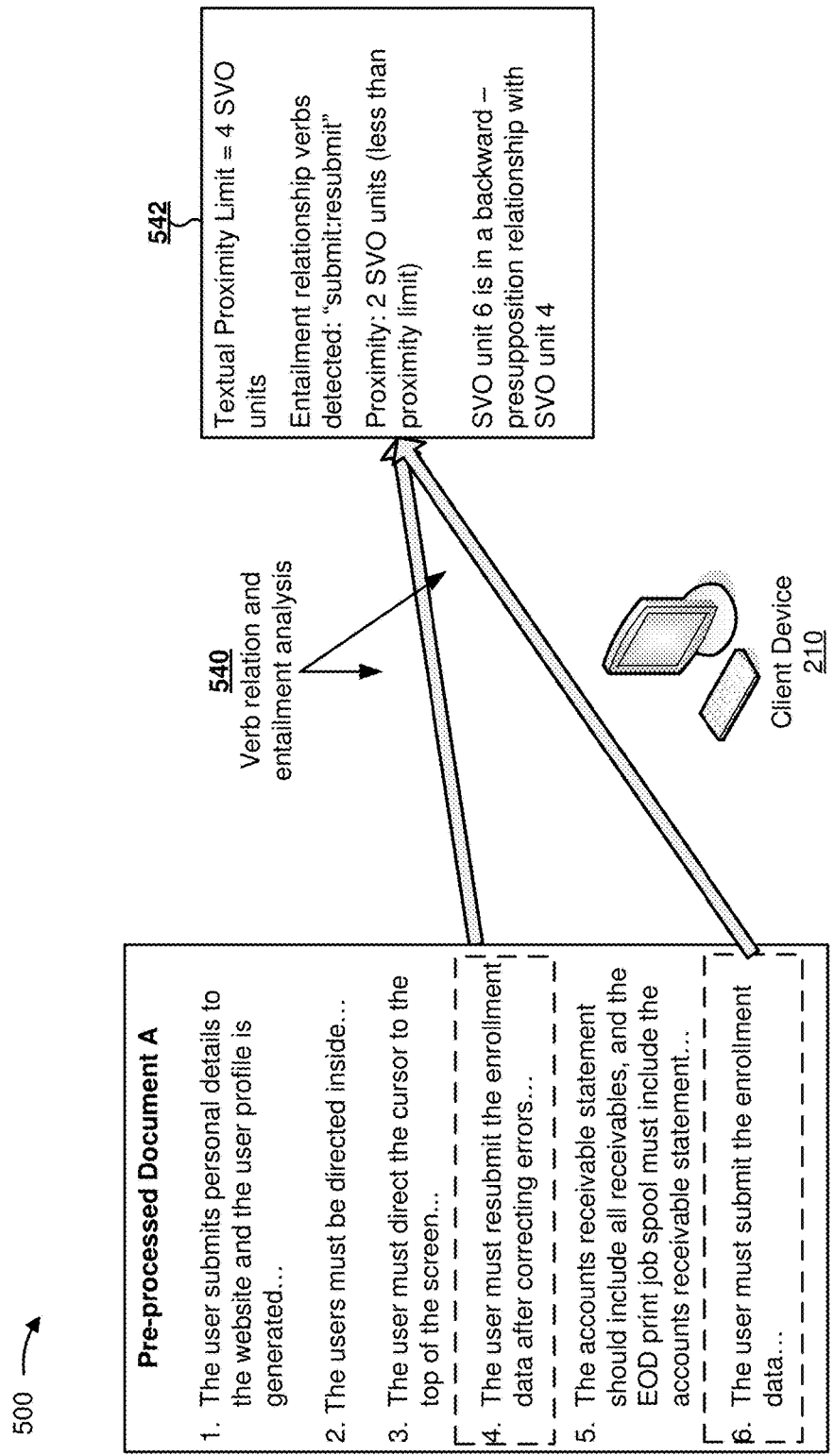

As shown in FIG. 5F, client device 210 may perform a verb relation and entailment analysis. Assume that client device 210 performs the verb relation and entailment analysis using a verb entailment database. As shown by reference number 540, assume that client device 210 performs the verb relation and entailment analysis on sentences 4 and 6 of the preprocessed document. As shown by reference number 542, assume that client device 210 receives, via the "Other Options . . . " element of the user interface, a textual proximity limit of 4 SVO units. As further shown, assume that client device 210 detects a pair of entailment relationship verbs (e.g., submit and resubmit). As shown, assume that client device 210 determines that the SVO units are in an entailment relationship based on the SVO units being separated by a single SVO unit (e.g., that the textual proximity of the SVO units is 2). As shown, based on the textual proximity, the relative position of the verbs, and the entailment relationship of the verbs, client device 210 may determine that SVO unit 6 is in a backward-presupposition relationship to SVO unit 4.

Figure 5G:
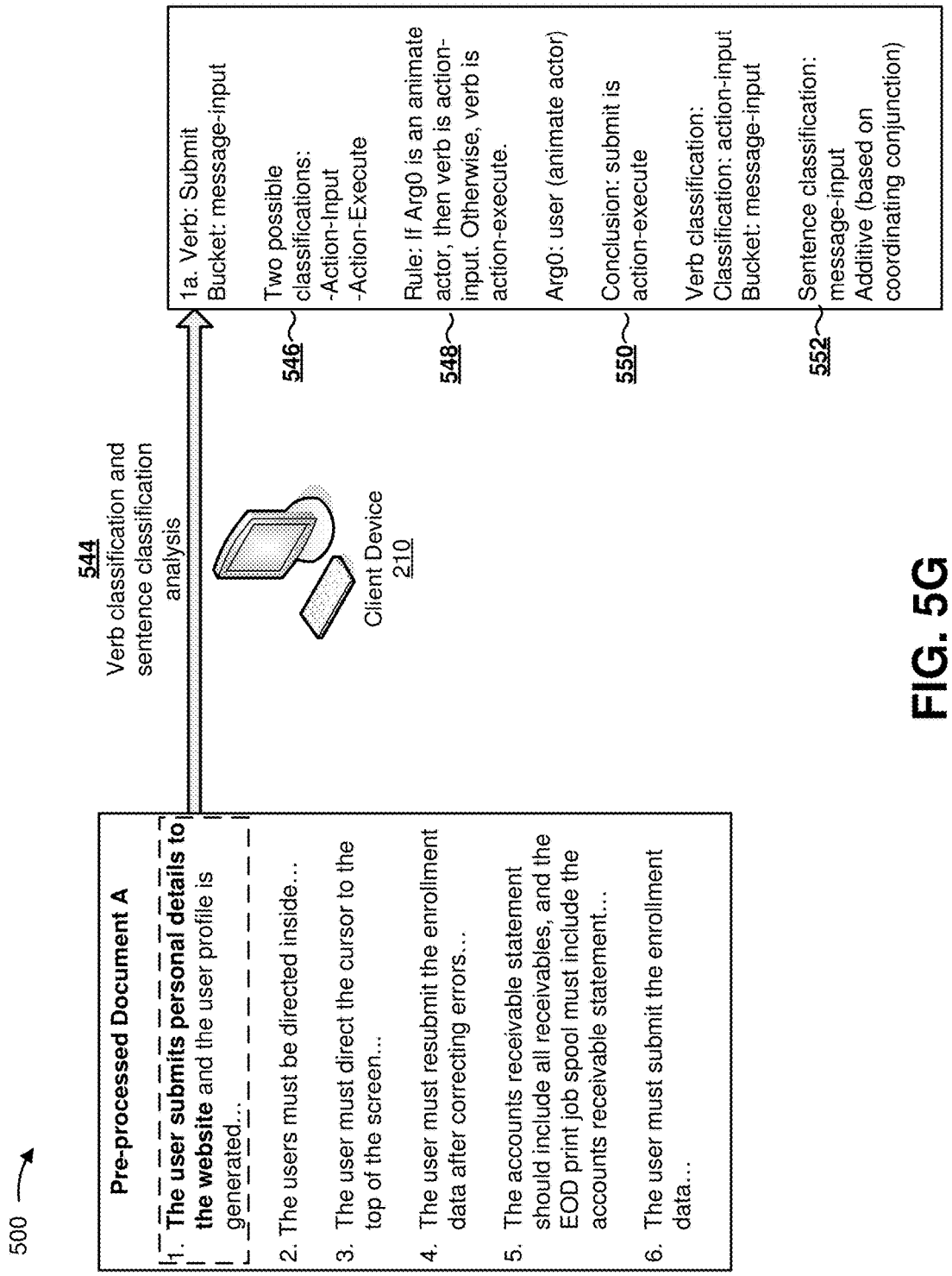

As shown in FIG. 5G, client device 210 may perform a verb classification and sentence classification analysis. As shown by reference number 544, assume that client device 210 performs a verb classification and sentence classification analysis on the first SVO unit of sentence 1. Assume that client device 210 performs the verb classification analysis based on a verb ontology database. As shown by reference number 546, client device 210 determines a verb bucket associated with the verb of "submit" (e.g., shown as message-input). As further shown, client device 210 may determine that "submit" is associated with two verb classifications (e.g., shown as action-input and action-execute). As shown by reference number 548, client device 210 may use a rule to determine a verb classification of "submit" (e.g., "If Arg0 is an animate actor, then verb is action-input. Otherwise, verb is action-execute."). Assume that "user" is associated with a role label of Arg0. As shown, client device 210 may determine that "user" is an animate actor. As shown by reference number 550, client device 210 may determine that "submit" is associated with a verb classification of "action-execute" based on the rule and based on the role label.

As shown by reference number 552, client device 210 may determine sentence classification information that describes the first SVO unit of sentence 1. As further shown, client device 210 may determine a first sentence classification of message-input (e.g., based on the verb bucket associated with "submit"), and a second sentence classification of additive (e.g., based on a coordinating conjunction of "and" present in the sentence).

Assume that client device 210 stores the SVO unit information and the semantic connection information determined in connection with FIGS. 5A-5G. In this way, client device 210 may determine SVO unit information and semantic connection information, which client device 210 may use to identify inconsistencies in a text and to generate a semantic network that describes the text.

As indicated above, FIGS. 5A-5G are provided merely as examples. Other examples are possible and may differ from what was described with regard to FIGS. 5A-5G.

Figure 6:
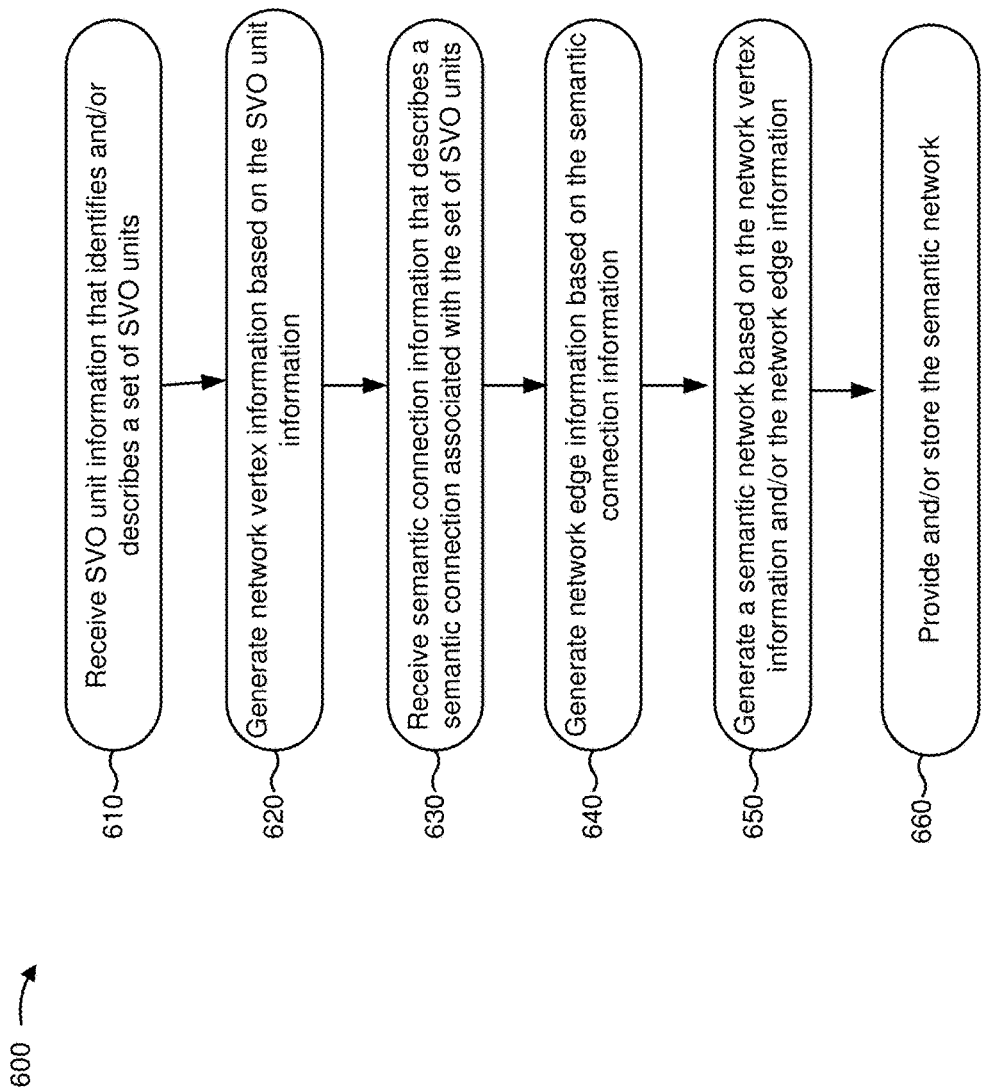
FIG. 6 is a flow chart of an example process for generating a semantic network based on semantic connection information.

FIG. 6 is a flow chart of an example process 600 for generating a semantic network based on semantic connection information. In some implementations, one or more process blocks of FIG. 6 may be performed by client device 210. In some implementations, one or more process blocks of FIG. 6 may be performed by another device or a group of devices separate from or including client device 210, such as server device 220.

As shown in FIG. 6, process 600 may include receiving and/or determining SVO unit information that describes a set of SVO units (block 610). For example, client device 210 may receive and/or determine SVO unit information. The SVO unit information may describe a set of SVO units (e.g., may include text of the set of SVO units, may identify discourse connective triplets associated with the set, may include role labeling information that describes the set, may include identifiers associated with the set, or the like). Client device 210 may use the SVO unit information to generate a semantic network that describes a text document, which may aid a user in identifying inconsistencies within the text document.

In some implementations, the SVO unit information may include information that identifies one or more SVO units. For example, the SVO unit information may include an SVO unit identifier (e.g., a number, or the like, that identifies an SVO unit), text of the SVO unit, tags associated with one or more words of the SVO unit, a discourse connective triplet associated with the SVO unit, or the like.

In some implementations, client device 210 may store the SVO unit information locally. For example, client device 210 may determine the SVO unit information by identifying SVO units and/or performing one or more SVO unit analysis techniques, and may store the SVO unit information locally. Client device 210 may access the locally stored SVO unit information to generate a semantic network. Additionally, or alternatively, client device 210 may receive the SVO unit information from another device, such as server device 220.

As further shown in FIG. 6, process 600 may include generating network vertex information based on the SVO unit information (block 620). For example, based on the SVO unit information, client device 210 may generate network vertex information. A vertex may be an element of a semantic network that is generated based on an SVO unit. The vertex may include part of or all of the SVO unit information associated with a particular SVO unit. In some implementations, client device 210 may process the SVO unit information to determine vertex vectors to generate vertices in a semantic network. For example, client device 210 may determine a set of vertex vectors based on a set of SVO unit information, and may apply a semantic network generation algorithm to the set of vertex vectors to generate a semantic network based on the set of SVO unit information.

In some implementations, client device 210 may generate a vertex vector for generating a vertex in a semantic network based on a particular SVO unit. For example, the vertex vector may include an identifier that identifies the particular SVO unit, text of the particular SVO unit, a discourse connective triplet associated with the particular SVO unit, role labels associated with a verb and/or one or more arguments of the particular SVO unit, or the like. In some implementations, the vertex vector may be represented as the following expression:

$$\tilde{V} = [(S, V, O), \{\underline{D_i}\}, \{Arg_i\}_V],$$

$$\text{where}\{\underline{D_i}\} \subset \left\{\bigcup_{i=1}^{t} D_i\right\} \text{ and } Arg_i \in \{0, 1\} \text{ for } i = 0, \ldots, n$$

In the expression, a particular vertex vector ($\tilde{V}$) that describes an SVO unit may include the text of the SVO unit (e.g., shown as (S, V, O)), a discourse connective triplet (e.g., the particular vertex vector may include a discourse connective triplet when a discourse marker is associated with the SVO unit, and is shown as $[D_i]$), and one or more role labels associated with the SVO unit (e.g., shown as $\{Arg_i\}_V$). For example, consider the SVO unit "First, John throws the ball." Assume the SVO unit is associated with an identifier of 1. The SVO unit may be represented by the following vector:

$$\tilde{V}_1 = [(\text{First,John throws the ball}), \{<\text{first,forward,start}>\}, \{Arg0=\text{John};Arg1=\text{ball}\}_{V1}]$$

As shown, the vertex vector may indicate the identifier (e.g., $\tilde{V}_1$), and may include the text of the SVO unit (e.g., "First, John throws the ball"), a discourse connective triplet associated with the SVO unit (e.g., {<first,forward,start>}), and/or one or more role labels associated with the SVO unit (e.g., {Arg0=John; Arg1=ball}$_{V1}$). Client device 210 may generate a vertex vector to describe the SVO units in the set of SVO units. Client device 210 may use the vertex vectors to generate the semantic network and/or to determine semantic connection information.

As further shown in FIG. 6, process 600 may include receiving and/or determining semantic connection information that describes a semantic connection associated with the set of SVO units (block 630). For example, client device 210 may receive and/or determine semantic connection information. In some implementations, client device 210 may store semantic connection information locally (e.g., after determining the semantic connection information, as described in more detail in association with FIG. 4 herein). Additionally, or alternatively, client device 210 may receive the semantic connection information from another device, such as server device 220 or the like. Client device 210 may use the semantic connection information to generate network edge information in order to generate a semantic network to describe a text document.

The semantic connection information may define and/or describe semantic connections between a set of SVO units. For example, the semantic connection information may identify two or more SVO units that share a semantic connection, a type of semantic connection between the two or more SVO units (e.g., an entailment relationship, a discourse connection type, or another connection type, such as a connection based on semantic role labeling, or the like), a weight of the connection (e.g., a value that describes a relative strength of a particular semantic connection), or the like.

As further shown in FIG. 6, process 600 may include determining network edge information based on the semantic connection information (block 640). For example, client device 210 may determine network edge information based on the semantic connection information. The network edge information may define an edge of the semantic network. An edge may connect two vertices of the semantic network, and may represent a semantic connection between two SVO units that are described by the two vertices. In some implementations, client device 210 may process the semantic connection information to determine the network edge information. For example, client device 210 may process the semantic connection information to determine an edge vector based on the semantic connection information.

In some implementations, client device 210 may determine an edge vector based on the semantic connection information. In some implementations, an edge vector may be represented as an expression:

$$\tilde{E}_{\tilde{V}_A,\tilde{V}_B,C} = [\tilde{V}_A, \tilde{V}_B, C, w]$$

In this expression, $\tilde{V}_A$ and $\tilde{V}_B$ may represent a first SVO unit and a second SVO unit that are connected by a semantic connection. C may represent a type of semantic connection associated with the edge vector (e.g., Ce may represent a semantic connection based on a verb entailment relationship, Cd may represent a semantic connection based on a discourse connection, Co may represent a semantic connection based on another type of connection, such as a locational role connection, a descriptive connection, or the like). In the expression, w may represent a weight associated with the semantic connection. For example, a semantic connection based on a locational discourse marker, a matching and structurally adjacent discourse connection, or the like, may be assigned a first weight (e.g., a weight of 1). A semantic connection based on an entailment relationship may be assigned a weight based on a proximity of the SVO units, as described in more detail elsewhere herein.

As further shown in FIG. 6, process 600 may include generating a semantic network based on the network vertex information and the network edge information (block 650). For example, client device 210 may generate a semantic network based on the network vertex information and the network edge information. In some implementations, client device 210 may generate the semantic network automatically (e.g., without user input). In some implementations, client device 210 may generate the semantic network based on user input (e.g., a user may request that client device 210 generate the semantic network).

A semantic network may be a directed graph that represents SVO unit information and semantic connection information. The semantic network may represent SVO unit information as a vertex (e.g., a point, a circle, a square, etc. on the graph that is provided in association with information that describes the SVO unit). The semantic network may represent semantic connection information as an edge (e.g., a connection between two vertices that is provided in association with information that describes the semantic connection). In some implementations, the semantic network may represent information related to an inconsistency. For example, client device 210 may detect an inconsistent requirement based on semantic connection information and may represent the inconsistent requirement in the semantic network (e.g., may provide a warning in association with an edge that represents the inconsistent requirement, or the like). In some implementations, client device 210 may generate the semantic network using an algorithm. For example, client device 210 may input, to a directed graphing algorithm, a set of vertex vectors and a set of edge vectors. Client device 210 may generate the semantic network based on the directed graphing algorithm.

As further shown in FIG. 6, process 600 may include storing and/or providing the semantic network (block 660). For example, client device 210 may store the semantic network and/or provide the semantic network. In some implementations, client device 210 may provide a semantic network representation for display (e.g., via a user interface provided by client device 210). Additionally, or alternatively, client device 210 may provide the semantic network to another device (e.g., server device 220, or the like). In this way, client device 210 may generate and provide a semantic network and/or a semantic network representation that describes semantic connections within a document in order to aid a user to understand the document. Based on the semantic network representation, the user may more easily determine relationships between instructions in the document, may determine missing or misplaced instructions, or the like. Based on the semantic network, client device 210 may determine information related to the document (e.g., may determine a similarity between the document and another document, may determine a frequency of a particular SVO unit, may determine a frequency of a particular semantic connection, may determine a quality rating of the document based on a number of inconsistencies in the document, or the like).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example implementation 700 relating to example process 600 shown in FIG. 6. FIGS. 7A-7E show an example of generating a semantic network based on semantic connection information. For the purpose of FIGS. 7A-7E, assume that client device 210 stores SVO unit information and semantic connection information that describes a text document identified as "Document B."

Figure 7A:
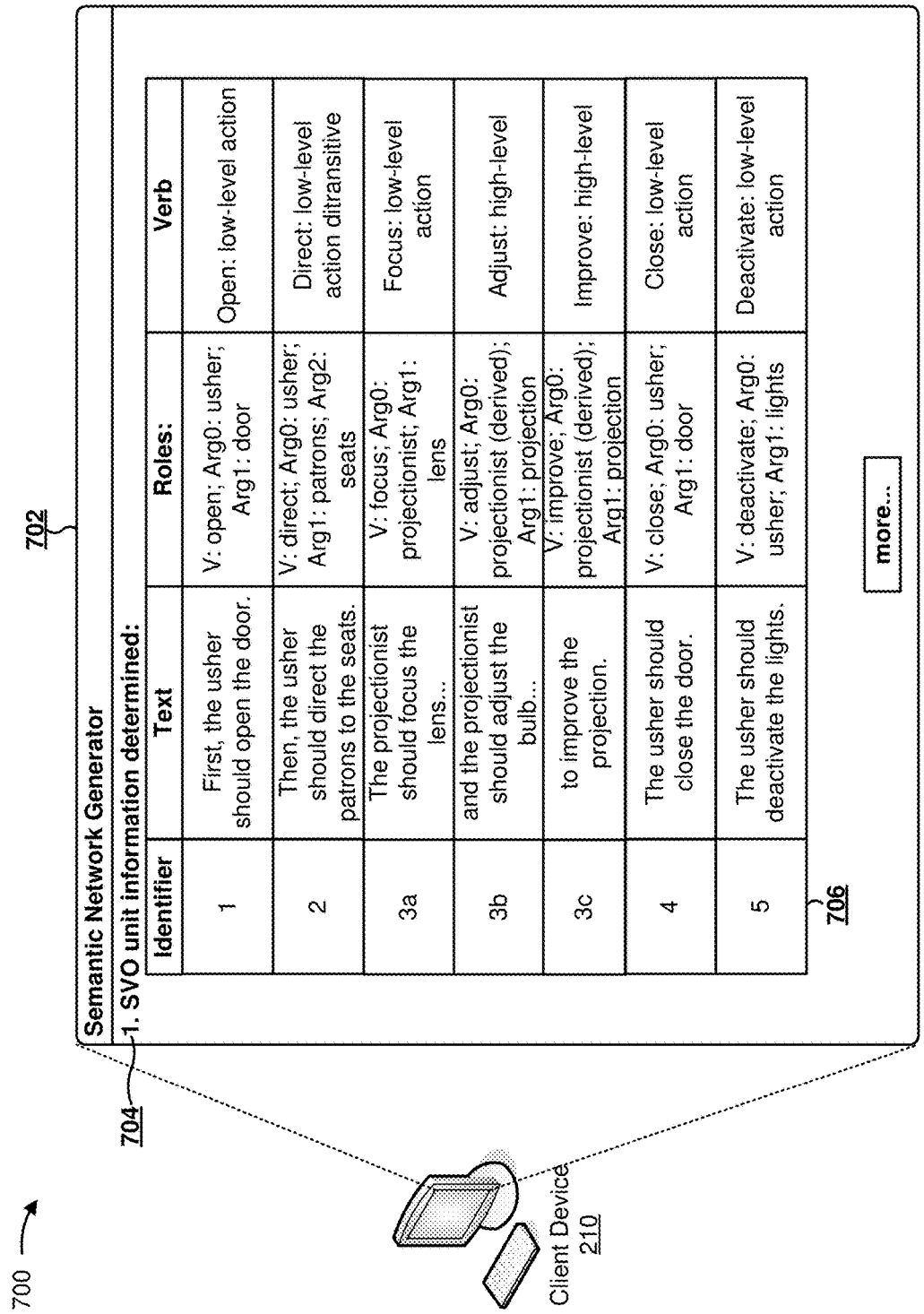
FIGS. 7A-7E are diagrams of an example implementation relating to the example process shown in FIG. 6.

As shown in FIG. 7A, and by reference number 702, client device 210 may provide a user interface for a semantic network generator to generate a semantic network that describes SVO unit information and semantic connection information. As shown by reference number 704, client device 210 may determine SVO unit information. Assume that client device 210 stores SVO unit information and determines the SVO unit information based on the stored SVO unit information. As shown by reference number 706, client device 210 may receive a set of identifiers that identify a set of SVO units. As further shown, client device 210 may receive text of the set of SVO units. As shown, client device 210 receives semantic role labels that describe the text of the set of SVO units. As further shown, client device 210 receives verb classification information that describes one or more verbs and a verb category of the one or more verbs associated with each of the set of SVO units.

Figure 7B:
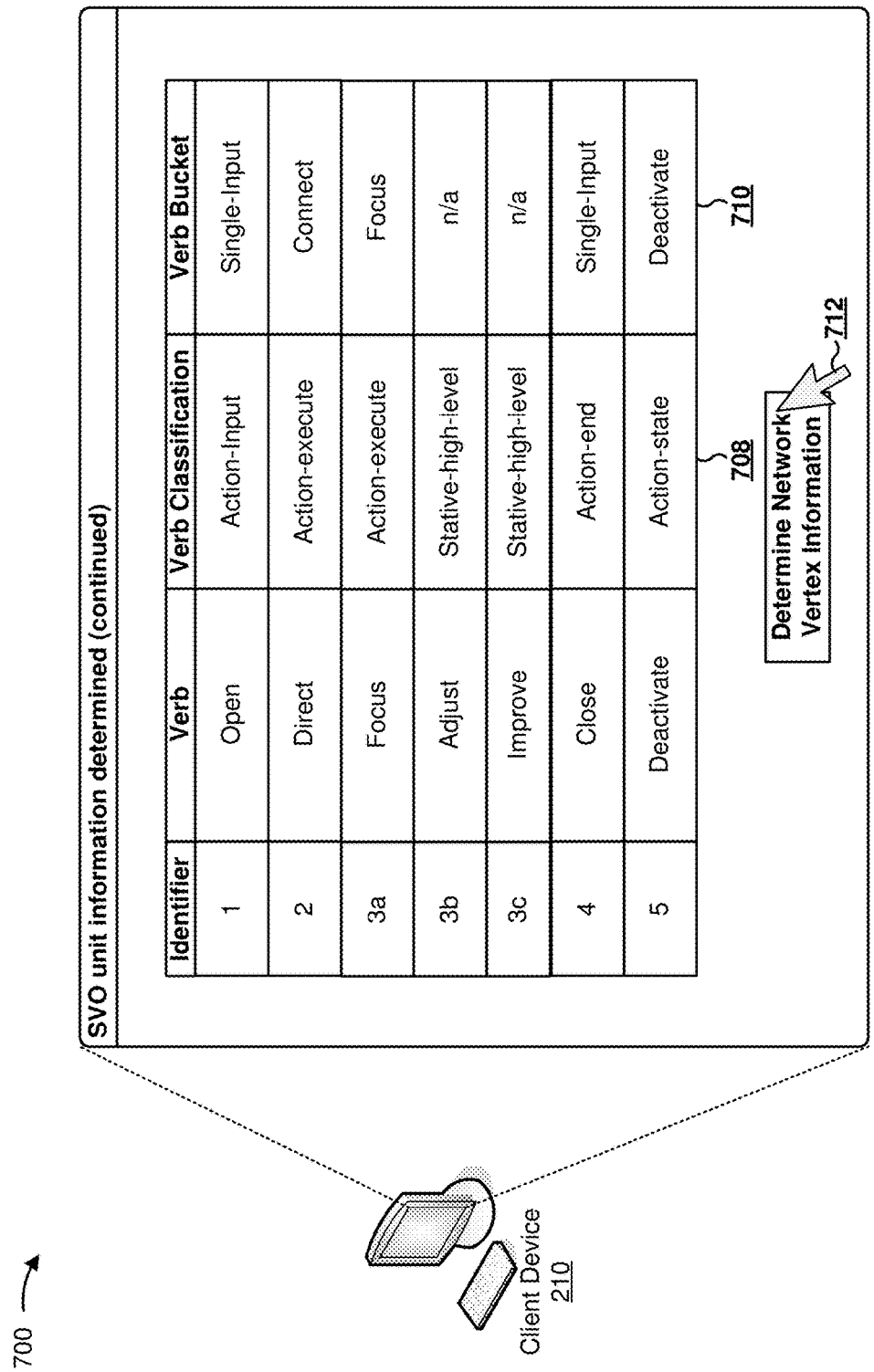

As shown in FIG. 7B, client device 210 may determine additional SVO unit information associated with the one or more verbs. Assume that client device 210 stores SVO unit information and determines the additional SVO unit information based on the stored SVO unit information. As shown by reference number 708, client device 210 may receive verb classification information associated with the one or more verbs. As shown by reference number 710, client device 210 may receive verb bucket information associated with the one or more verbs. As shown by reference number 712, assume that client device 210 receives an input that causes client device 210 to determine network vertex information based on the SVO unit information.

Figure 7C:
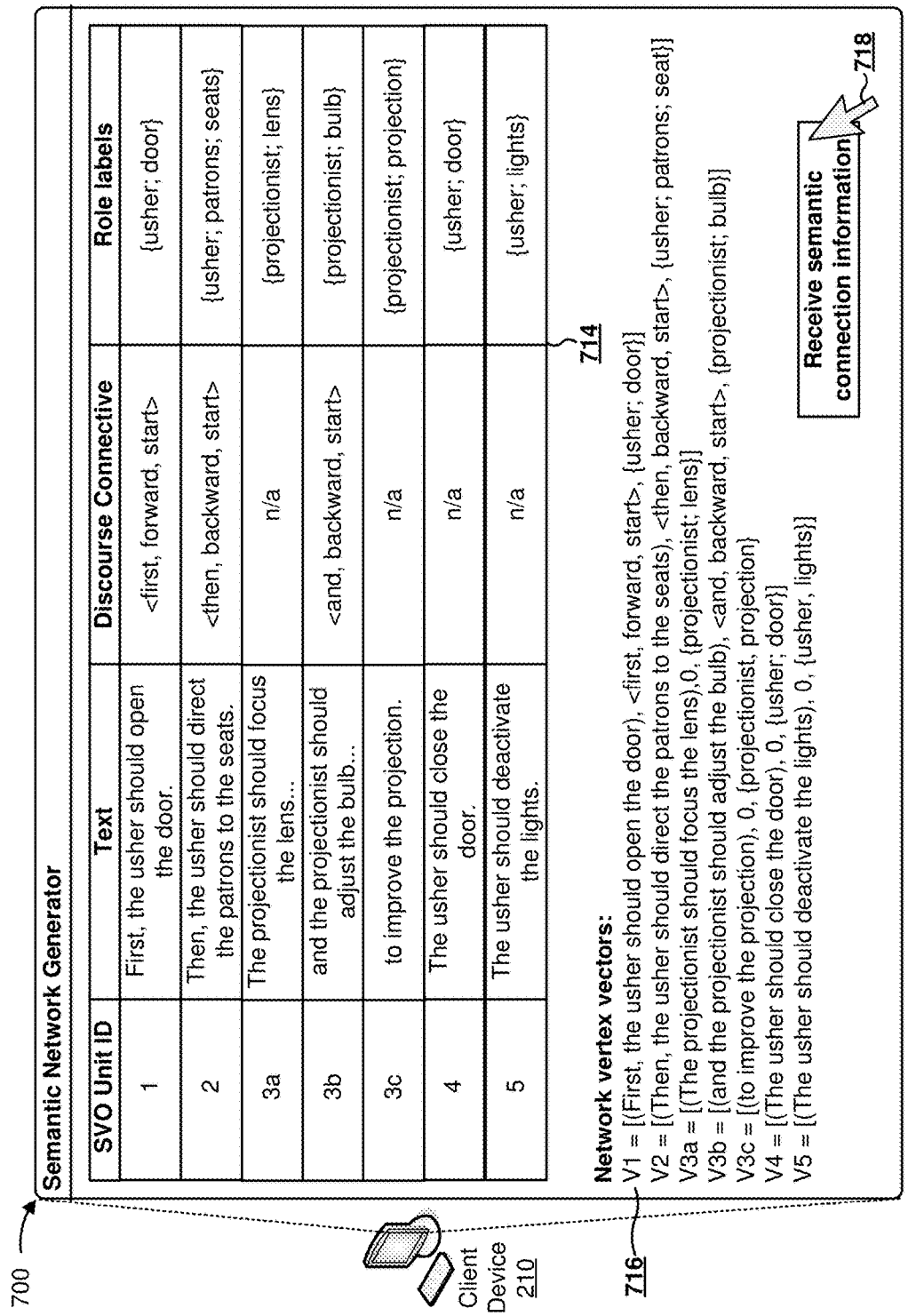

As shown in FIG. 7C, client device 210 may determine additional SVO unit information. Assume that client device 210 stores SVO unit information and determines the SVO unit information based on the stored SVO unit information. Assume that client device 210 receives additional information that describes discourse connective information associated with the set of SVO units (e.g., in a discourse connective triplet format). As shown by reference number 714, the SVO unit information may include a discourse connective triplet associated with one or more SVO units of the set of SVO units. As further shown, the SVO unit information may include role labels associated with the one or more SVO units. As shown by reference number 716, client device 210 may generate a network vertex vector based on each SVO unit of the set of SVO units. As shown, client device 210 generates a first network vertex vector of:

$V1=[(\text{First, the usher should open the door}),<\text{first, forward,start}>,\{\text{usher;door}\}]$.

The network vertex vector is identified by an identifier of V1 (e.g., that indicates that the network vertex vector is associated with SVO unit 1). The network vertex vector may further include text of SVO unit 1, a discourse connective triplet that describes a discourse marker included in SVO unit 1, and an array of role labels associated with SVO unit 1. Assume that client device 210 stores the set of network vertex vectors. As shown by reference number 718, client device 210 may receive a user input to cause client device 210 to receive semantic connection information.

Figure 7D:
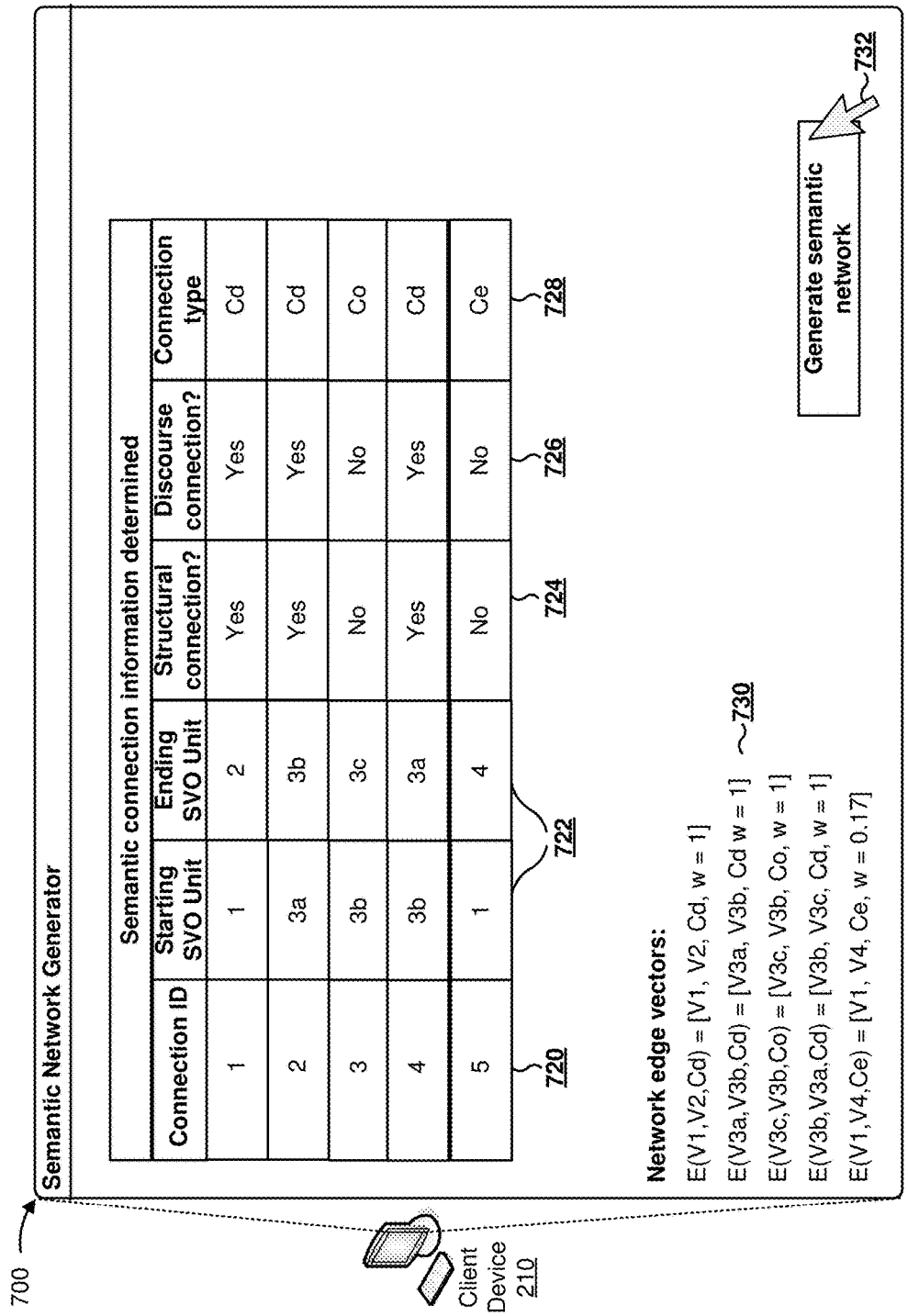

As shown in FIG. 7D, client device 210 may determine semantic connection information that describes semantic connections shared by one or more of the set of SVO units. Assume that client device 210 stores semantic connection information and determines the semantic connection information based on the stored semantic connection information. As shown by reference number 720, the semantic connections may be associated with an identifier (e.g., shown as "Connection ID"). As shown by reference number 722, client device 210 may receive information that indicates a starting SVO unit and an ending SVO unit of each of the semantic connections (e.g., shown as SVO unit identifiers that identify the starting SVO unit and the ending SVO unit). As shown by reference number 724, client device 210 may receive information that indicates whether each semantic connection is a structural connection (e.g., a connection between two adjacent SVO units). As shown by reference number 726, client device 210 may receive information that indicates whether each semantic connection is based on a discourse connection. As shown by reference number 728, client device 210 may receive information that indicates a connection type associated with each semantic connection (e.g., a connection type of Cd may identify a discourse connection type, a connection type of Ce may indicate an entailment relationship connection type, a connection type of Co may indicate another connection type (e.g., a connection based on role labeling, or the like).

As shown by reference number 730, client device 210 may generate a set of network edge vectors based on the semantic connection information. For example, client device 210 generates a network edge vector of:

$E(V1,V2,Cd)=[V1,V2,Cd,w=1]$.

As shown, the network edge vector may identify a particular semantic connection by identifying a first vertex and a second vertex that are connected by the edge. As shown, the network edge vector may identify a connection type associated with the semantic connection. For example, the network edge vector shown above includes a connection type of Cd, identifying a discourse connection. As further shown, the network edge vector may identify a weight (e.g., a weight of 1), indicating a particular confidence level associated with the structural connection. As shown, the vector E(V1,V4,Ce) is associated with a weight of 0.17. Assume that the vector E(V1,V4,Ce) is associated with the weight of 0.17 based on the semantic connection described by the network edge vector being an entailment relationship, and based on a calculation to determine the weight associated with the semantic connection.

As shown by reference number 732, assume that client device 210 receives a user interaction to cause client device 210 to generate a semantic network. Assume that client device 210 generates a semantic network based on the network vertex vectors and the network edge vectors. Assume further that client device 210 determines an inconsistency based on the text. Here, assume that the inconsistency is based on SVO unit 5 containing "deactivate." Assume further that "deactivate" entails a previous usage of "activate," based on a verb entailment database, and that the text does not include the previous usage of "activate."

Figure 7E:
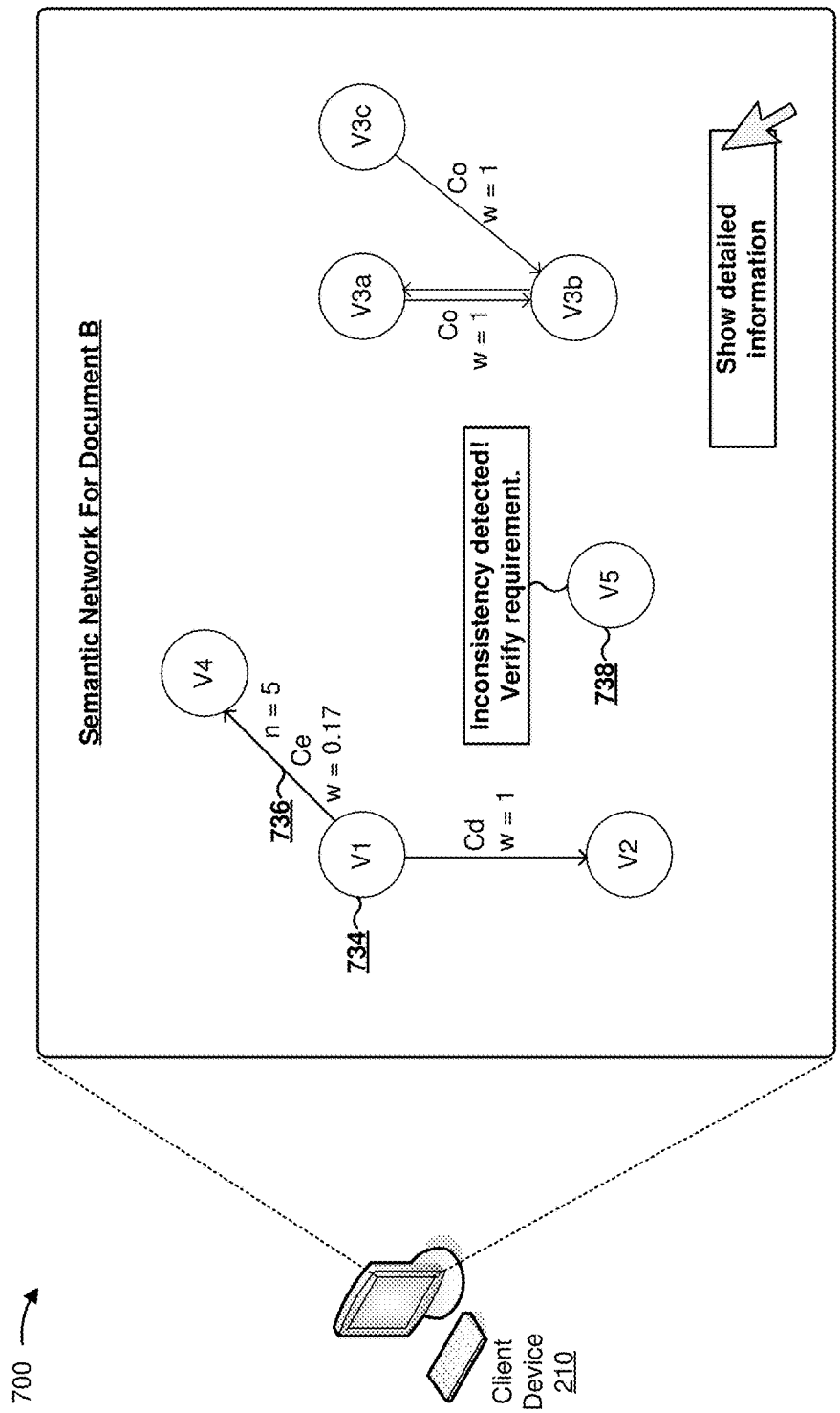

As shown in FIG. 7E, client device 210 may provide the semantic network that describes Document B. As shown by reference 734, the semantic network may include vertices based on the network vertex vectors that describe the one or more SVO units. As shown by reference number 736, the semantic network may include edges that connect the vertices. Assume that client device 210 generates the edges based on the network edge vectors that describe the semantic connections. As further shown, the edges may be provided for display in association with information that describes the edges (e.g., a weight associated with the edge, a connection type associated with the edge, etc.). As shown, the edge between vertex V1 and vertex V4 identifies a textual proximity identifier that identifies a textual proximity of SVO unit 1 and SVO unit 4. Assume that client device 210 provides the textual proximity identifier based on SVO unit 1 and SVO unit 4 sharing an entailment relationship.

As shown by reference number 738, the semantic network may indicate an inconsistency in the text. Here, client device 210 determines an inconsistency associated with SVO unit 5 based on SVO unit 5 including the verb "deactivate" without a prior usage of the verb "activate." Based on the inconsistency, client device 210 provides, in the semantic network and in association with vertex V5, an indication of the inconsistency. A user viewing the semantic network may refer to Document B to address the inconsistency (e.g., to modify Document B and correct the inconsistency). In some implementations, the inconsistency may be addressed automatically. For example, client device 210 may insert, in Document B, a sentence, prior to SVO unit 5, of "The usher should activate the lights."

In this way, client device 210 may extract SVO units from a document and may determine semantic connection information that describes semantic connections between the SVO units. Client device 210 may determine inconsistencies in the document based on the SVO units and the semantic connection information, and may generate and/or provide a semantic network that describes the SVO units, the semantic connection information, and/or the inconsistencies. Client device 210 may analyze the semantic network to interpret the document, to find the inconsistencies, or the like.

As indicated above, FIGS. 7A-7E are provided merely as examples. Other examples are possible and may differ from what was described with regard to FIGS. 7A-7E.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A server device, comprising:
one or more memories; and
one or more processors, communicatively coupled to the one or more memories, to:
obtain text to be analyzed to determine semantic connections between sections of the text;
identify a plurality of subject-verb-object (SVO) units included in the text;
determine SVO unit information that describes the plurality of SVO units;

select, based on a characteristic of the text, one or more SVO unit analysis techniques to perform to determine semantic connection information,
the characteristic of the text including one of:
a size of the text,
contents included in the text,
a type of document that includes the text, or
a file format of a file that includes the text,
the one or more SVO unit analysis techniques being selected from:
a semantic role labeling analysis technique,
a discourse connective analysis technique,
a verb relation and entailment analysis technique,
a verb classification and sentence classification technique, and
a boundary connector and flow analysis technique;
analyze, utilizing the one or more SVO unit analysis techniques, the SVO unit information to determine semantic connection information,
the semantic connection information identifying one or more semantic connections between two or more of the plurality of SVO units,
the one or more semantic connections identifying relationships between verbs associated with the two or more of the plurality of SVO units;
generate a semantic network based on the SVO unit information and the semantic connection information,
the semantic network indicating an inconsistency between the two or more of the plurality of SVO units; and
provide information regarding the semantic network for display on a user interface of a client device,
the information identifying the inconsistency between the two or more of the plurality of SVO units, and
the information identifying the inconsistency being displayed on the user interface of the client device to allow a user to correct the inconsistency between the two or more of the plurality of SVO units.

2. The server device of claim 1, where the one or more processors are further to:
generate a semantic network representation based on the SVO unit information and the semantic connection information,
the semantic network representation displaying information that describes the plurality of SVO units, and
the semantic network representation displaying the semantic connection information.

3. The server device of claim 1, where the one or more processors are further to:
assign role labels to one or more words of the plurality of SVO units,
the role labels facilitating analysis of the plurality of SVO units; and
generate the semantic connection information based on the role labels.

4. The server device of claim 1, where the one or more processors are further to:
analyze the SVO unit information by determining a verb entailment relationship,
the verb entailment relationship indicating a semantic connection between a first verb of a first SVO unit and a second verb of a second SVO unit,
the first SVO unit and the second SVO unit being of the plurality of SVO units, and
the verb entailment relationship being determined based on an entailment memory; and
provide information that identifies the verb entailment relationship.

5. The server device of claim 1, where the one or more processors are further to:
analyze the SVO unit information by determining a discourse connective relationship,
the discourse connective relationship indicating a semantic connection between a first SVO unit and a second SVO unit based on a discourse marker associated with the first SVO unit or the second SVO unit,
the first SVO unit and the second SVO unit being of the plurality of SVO units; and
provide information that identifies the discourse connective relationship.

6. The server device of claim 1, where the one or more processors are further to:
parse the text to identify the plurality of SVO units;
tag one or more words of the text with a part of speech that describes the one or more words based on parsing the text;
identify a structural connection between a pair of SVO units of the plurality of SVO units based on tagging the one or more words,
the structural connection being a semantic connection between the pair of SVO units,
the structural connection being based on an adjacency of the pair of SVO units, and
the structural connection being based on a tagged word associated with the pair of SVO units; and
generate the semantic connection information based on the structural connection.

7. The server device of claim 1, where the one or more processors are further to:
assign a classification to a verb associated with the plurality of SVO units to facilitate analyzing the text,
the classification being based on a verb ontology database, and
the classification describing a verb bucket associated with the verb; and
analyze the plurality of SVO units to determine the semantic connection information,
the semantic connection information being determined based on the classification.

8. A computer-readable medium storing instructions, the instructions comprising:
one or more instructions that, when executed by one or more processors, cause the one or more processors to:
receive text to be analyzed to identify relationships within the text;
identify a first subject-verb-object (SVO) unit and a second SVO unit included in the text,
the first SVO unit being different than the second SVO unit;
identify a characteristic of the text,
the characteristic of the text including one of:
a size of the text,
contents included in the text,
a type of document that includes the text, or
a file format of a file that includes the text;
select, based on the characteristic of the text, a SVO unit analysis technique, the SVO unit analysis technique including at least one of:
   a semantic role labeling analysis technique,
   a discourse connective analysis technique,
   a verb relation and entailment analysis technique,
   a verb classification and sentence classification analysis technique,
   or
   a boundary connector and flow analysis technique;
perform the SVO analysis technique on the text to determine a semantic connection,
   the semantic connection describing a relationship between the first SVO unit and the second SVO unit; and
provide information that describes the first SVO unit, the second SVO unit, and the semantic connection for display on a user interface of a client device,
   the information identifying an inconsistency between the first SVO unit and the second SVO unit, and
   the information identifying the inconsistency being displayed on the user interface of the client device to allow a user to correct the inconsistency between the first SVO unit and the second SVO unit.

9. The computer-readable medium of claim 8, where the first SVO unit includes a first verb;
where the second SVO unit includes a second verb; and
where the instructions further comprise:
   one or more instructions that, when executed by the one or more processors, cause the one or more processors to:
      perform the semantic role labeling analysis to assign roles to one or more words associated with the first SVO unit and one or more words associated with the second SVO unit;
      determine an entailment relationship between the first verb and the second verb,
         the entailment relationship being determined based on the roles and based on a verb entailment database; and
      determine the semantic connection based on the entailment relationship.

10. The computer-readable medium of claim 8, where
the inconsistency is determined based on the first SVO unit and the second SVO unit, and
the inconsistency indicating an inconsistent relationship between the first SVO unit and the second SVO unit,
   the inconsistent relationship being a different relationship than a relationship described by the semantic connection; and
provide information that identifies the inconsistency.

11. The computer-readable medium of claim 8, where the instructions further comprise:
   one or more instructions that, when executed by the one or more processors, cause the one or more processors to:
      perform the discourse connective analysis technique to determine a discourse connective relationship between the first SVO unit and the second SVO unit,
         the discourse connective relationship indicating the semantic connection between the first SVO unit and the second SVO unit based on a discourse marker associated with the first SVO unit or the second SVO unit; and
      provide information that identifies the discourse connective relationship.

12. The computer-readable medium of claim 8, where the first SVO unit is adjacent to the second SVO unit in the text; and
where the instructions further comprise:
   one or more instructions that, when executed by the one or more processors, cause the one or more processors to:
      parse the text to identify the first SVO unit and the second SVO unit;
      tag one or more words of the text to identify a role of the one or more words based on parsing the text;
      identify a structural connection between the first SVO unit and the second SVO unit based on tagging the one or more words,
         the structural connection being the semantic connection between the first SVO unit and the second SVO unit,
         the structural connection being identified based on the first SVO unit being adjacent to the second SVO unit, and
         the structural connection being based on a tagged word associated with the first SVO unit or the second SVO unit; and
      determine the semantic connection based on the structural connection.

13. The computer-readable medium of claim 8, where the instructions further comprise:
   one or more instructions that, when executed by the one or more processors, cause the one or more processors to:
      generate a semantic network based on the first SVO unit, the second SVO unit, and the semantic connection,
         the semantic network identifying the first SVO unit and the second SVO unit, and
         the semantic network indicating an association between the first SVO unit and the second SVO unit based on the semantic connection; and
      provide a semantic network representation based on the semantic network.

14. The computer-readable medium of claim 8, where the instructions further comprise:
   one or more instructions that, when executed by the one or more processors, cause the one or more processors to:
      pre-process the text by at least one of:
         correcting a spelling error in the text,
         identifying an anaphora in the text, or
         identifying a boundary in the text.

15. A method, comprising:
   obtaining, by a device, a text to analyze to generate a semantic network that describes semantic connections associated with the text;
   parsing, by the device, the text to facilitate analyzing the text;
   extracting, by the device and from the text, two or more subject-verb-object (SVO) units,
      the two or more SVO units being associated with two or more verbs, and
      the two or more SVO units describing one or more requirements included in the text;
   selecting, by the device and based on a characteristic of the text, one or more SVO unit analysis techniques to perform to determine semantic connection information,
      the characteristic of the text including one of:

a size of the text,
contents included in the text,
a type of document that includes the text, or
a file format of a file that includes the text,
the one or more SVO unit analysis techniques being selected from:
a semantic role labeling analysis technique,
a discourse connective analysis technique,
a verb relation and entailment analysis technique,
a verb classification and sentence classification technique, and
a boundary connector and flow analysis technique;
analyzing, by the device and based on utilizing the one or more SVO unit analysis techniques, the two or more SVO units to determine one or more semantic connections,
the one or more semantic connections describing one or more relationships between the two or more SVO units,
the one or more relationships being based on the two or more verbs;
generating, by the device, a semantic network representation based on the two or more SVO units and the one or more semantic connections,
the semantic network representation describing the two or more SVO units and the one or more semantic connections, and
the semantic network representation indicating the one or more relationships; and
providing, by the device, information regarding the semantic network for display on a user interface of a client device,
the information identifying an inconsistency between the two or more SVO units, and
the information identifying the inconsistency being displayed on the user interface of the client device to allow a user to correct the inconsistency between the two or more SVO units.

16. The method of claim 15,
where the inconsistency is determined based on a first SVO unit and a second SVO unit of the two or more SVO units, and
the inconsistency indicating an inconsistent relationship between the first SVO unit and the second SVO unit,
the inconsistent relationship being different than a relationship described by a semantic connection shared by the first SVO unit and the second SVO unit.

17. The method of claim 15, further comprising:
determining an entailment relationship between a first SVO unit and a second SVO unit of the two or more SVO units,
the entailment relationship being determined based on a verb entailment database, and
the entailment relationship indicating that a first verb associated with the first SVO unit is associated with a second verb associated with the second SVO unit based on the verb entailment database; and
determining semantic connection information based on the entailment relationship.

18. The method of claim 15, where two adjacent SVO units of the two or more SVO units are adjacent in the text; and
where the method further comprises:
identifying a structural connection between the two adjacent SVO units,
the structural connection being a semantic connection between the two adjacent SVO units,
the structural connection being identified based on the two adjacent SVO units being adjacent, and
the structural connection being based on a tagged word associated with one or more of the two adjacent SVO units; and
determining semantic connection information based on the structural connection.

19. The method of claim 15, further comprising:
identifying a discourse connective relationship,
the discourse connective relationship indicating a semantic connection between the two or more SVO units based on a discourse marker associated with one or more of the two or more SVO units; and
including, in the semantic network representation, information that identifies the discourse connective relationship.

20. The method of claim 15, further comprising:
classifying one or more verbs associated with the two or more SVO units,
the one or more verbs being classified based on a verb ontology database;
determining a relationship between two or more particular SVO units of the two or more SVO units based on classifying the one or more verbs,
the relationship indicating that the two or more particular SVO units are associated with a multi-step process; and
determining semantic connection information based on the relationship between the two or more particular SVO units.

* * * * *